United States Patent [19]
Yuan et al.

[11] Patent Number: 5,821,986
[45] Date of Patent: Oct. 13, 1998

[54] METHOD AND APPARATUS FOR VISUAL COMMUNICATIONS IN A SCALABLE NETWORK ENVIRONMENT

[75] Inventors: Xiancheng Yuan, Bedford; Matthew M. Bace, Arlington, both of Mass.

[73] Assignee: PictureTel Corporation, Andover, Mass.

[21] Appl. No.: 333,755

[22] Filed: Nov. 3, 1994

[51] Int. Cl.$^6$ ...................................... H04N 7/14
[52] U.S. Cl. ........................ 348/17; 348/15; 379/93.21
[58] Field of Search .................. 348/13–19, 400, 348/401, 402, 409, 410, 413, 415, 416, 420, 421, 424, 425, 398, 441; 379/93, 100, 201, 94, 93.01, 93.08, 93.17, 93.21, 100.01; 370/260

[56] References Cited

U.S. PATENT DOCUMENTS

| | | | |
|---|---|---|---|
| 4,494,144 | 1/1985 | Brown | 348/15 |
| 4,888,795 | 12/1989 | Ando et al. | 348/18 |
| 5,048,111 | 9/1991 | Jones et al. | 348/398 |
| 5,136,581 | 8/1992 | Muehrcke | 370/62 |
| 5,309,232 | 5/1994 | Hartung et al. | 348/384 |
| 5,365,265 | 11/1994 | Shibata et al. | 348/15 |
| 5,371,535 | 12/1994 | Takizawa | 348/15 |
| 5,392,223 | 2/1995 | Caci | 348/17 |
| 5,436,665 | 7/1995 | Ueno et al. | 348/425 |
| 5,444,491 | 8/1995 | Lim | 348/441 |
| 5,446,491 | 8/1995 | Shibata et al. | 370/260 |
| 5,453,780 | 9/1995 | Chen et al. | 348/15 |
| 5,481,297 | 1/1996 | Cash et al. | 348/13 |

*Primary Examiner*—Curtis A. Kuntz
*Assistant Examiner*—Stephen Wolff Palan
*Attorney, Agent, or Firm*—Fish & Richardson P.C.

[57] ABSTRACT

A method and apparatus for providing a flexible and scalable videoconferencing system for use in connection with a network provides for scalably encoding an image sequence for transmission onto the network. The encoding enables the encoded image sequence to be decoded at any one of at least two spatial resolutions and any one of at least two frame rates. The decoder, depending upon the computing platform, its resources, speed, and efficiencies, can select to decode the received image at any of the available spatial resolutions and at any of the available frame rates. A lower spatial resolution and/or a lower frame rate require less computing resources. Multiple received image sequences can be decoded simultaneously, at, for example, a lowest resolution. The decoded images can be displayed for viewing on the computer monitor at the desired spatial resolution level and frame rate.

64 Claims, 12 Drawing Sheets

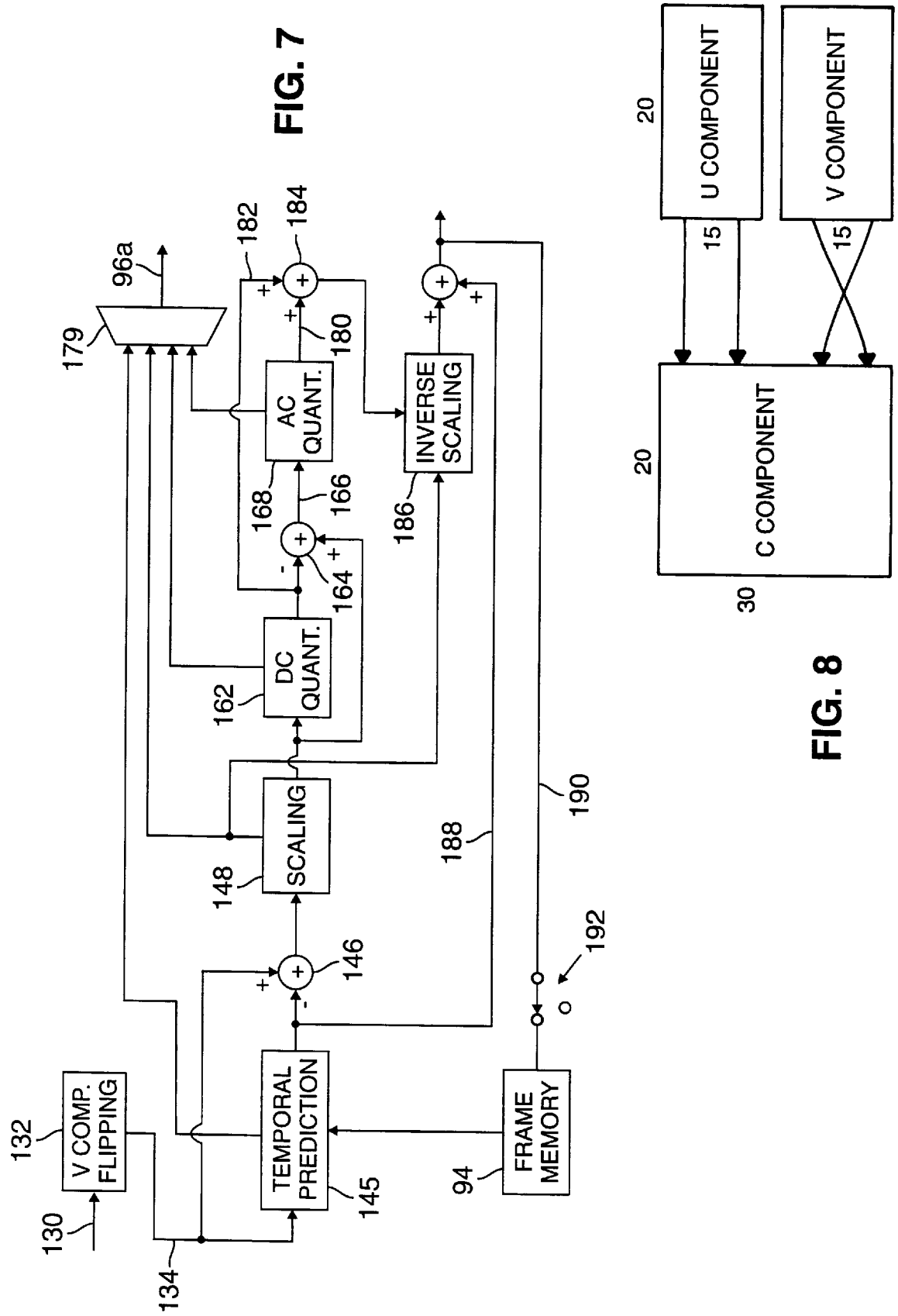

PREDICTION BLOCK   BLOCK IN THE FRAME MEMORY

COMPUTE DC VALUE (a) 150   (b) 160

| $R_r$ | $R_D$ | $n_R$ | \multicolumn{12}{c|}{NUMBER OF BLOCKS REFRESHED ON FRAME...} |
|---|---|---|---|---|---|---|---|---|---|---|---|---|---|---|
| | | | 0 | 1 | 2 | 3 | 4 | 5 | 6 | 7 | 8 | 9 | 10 | 11 |
| 2 | 1 | 54 | 54 | 0 | 54 | 0 | 54 | 0 | 54 | 0 | 54 | 0 | 54 | 0 |
| 4 | 1 | 54 | 54 | 0 | 0 | 0 | 54 | 0 | 0 | 0 | 54 | 0 | 0 | 0 |
| 4 | 4 | 14 | 14 | 14 | 14 | 12 | 14 | 14 | 14 | 12 | 14 | 14 | 14 | 12 |
| 7 | 3 | 18 | 18 | 18 | 18 | 0 | 0 | 0 | 0 | 18 | 18 | 18 | 0 | 0 |
| 10 | 5 | 11 | 11 | 11 | 11 | 11 | 10 | 0 | 0 | 0 | 0 | 0 | 11 | 11 |

FIG. 16

```
       COLUMN
     1  2  3  4  5
   1 | 1| 2| 3| 4| 5|
   2 | 6| 7| 8| 9|10|
ROW 3 |11|12|13|14|15|
   4 |16|17|18|19|20|
   5 |21|22|23|24|25|
```

| BLOCK NUMBER | SUM OF ROW(S) | AND COLUMNS |
|---|---|---|
| 1 | 1 | 1 |
| 2 | 1 | 1,2 |
| 3 | 1 | ALL |
| 4 | 1 | 4,5 |
| 5 | 1 | 5 |
| 6 | 1,2 | 1 |
| 7 | 1,2 | 1,2 |
| 8 | 1,2 | ALL |
| 9 | 1,2 | 4,5 |
| 10 | 1,2 | 5 |
| 11 | ALL | 1 |
| 12 | ALL | 1,2 |
| 13 | ALL | ALL |
| 14 | ALL | 4,5 |
| 15 | ALL | 5 |
| 16 | 4,5 | 1 |
| 17 | 4,5 | 1,2 |
| 18 | 4,5 | ALL |
| 19 | 4,5 | 4,5 |
| 20 | 4,5 | 5 |
| 21 | 5 | 1 |
| 22 | 5 | 1,2 |
| 23 | 5 | ALL |
| 24 | 5 | 4,5 |
| 25 | 5 | 5 |

FIG. 18

METHOD AND APPARATUS FOR VISUAL COMMUNICATIONS IN A SCALABLE NETWORK ENVIRONMENT

BACKGROUND OF THE INVENTION

The invention relates generally to a method and apparatus for effecting video or visual communications, and more particularly, to a video compression method and apparatus for effecting visual communications in an environment requiring varying data transmission rates, such as network-connected personal computers, in which a minimum data throughput rate is not guaranteed.

Video communications, also referred to as videoconferencing, has developed substantially since the introduction of the AT&T Picture Phone in the 60's. Most importantly, the substantial reduction in video bandwidth enabled by digital processing equipment manufactured by, among others, PictureTel Corporation beginning in about 1985, has resulted in remarkable growth in room or group conferencing systems. The so-called video codec (coder/decoder), operating either under a proprietary algorithm or under the ITU H.320 Standard, enables two or more videoconferencing devices to communicate satisfactorily over dedicated digital lines having bandwidths of 128kilobits per second or less.

These bandwidths can be typically provided by telephone communications T1 service, switched 56 service, or ISDN service. The digital communications environment in which these systems operate, is well defined. Thus, the communication environment must meet minimum criteria regardless of whether a standards based system, or a proprietary system is used. In either instance, there are known communications parameters (for example, available bandwidth and system capacity) with which one is dealing and provide a guaranteed data throughput rate with low bit error rates.

In other network environments, however, a minimum guaranteed data throughput may not be guaranteed. For example, in a circuit-switched telephone line, uncontrolled environmental conditions, such as can be found in wireless communications, such as cellular telephone, can cause, in effect, a need to reduce the data transmission rate over the line. In shared networks, such as a packet-switched network, and in particular, a metropolitan area network or a local area network, a minimum data throughput is not guaranteed. Even in networks with guaranteed data throughput such as switched 56 and ISDN, there can be instances where the video data rate can advantageously be reduced to enable, for example, more effective application sharing.

Each of these situations thus create a situation in which the communication channel has a data throughput which is not a priori, well defined and/or constant. In the description which follows, the application will focus on the local area network typically used with personal computers, however it will be understood that the invention is equally adaptable and useful with any network or channel in which the channel video data throughput will not be a priori determined. Such networks or channels are referred to herein as a "scalable" network.

In a typical local area network, personal computing environment, these parameters are not necessarily constant or known. Thus, not all personal computers connected to the local area network need have the same computing capability either in platform or computing resources. For example, they may be 486/33, 486/66, or Pentium class machines. In addition, since video communications over the personal computer are typically displayed on the personal computer terminal, the display size may vary and be in the order of 3–6 inches. Furthermore, when operating over a local area network, bandwidth considerations may be a significant issue. The dedicated telephone lines (with their known bandwidths) which are available to, for example, conference room size systems, will not typically be comparable to a local area network. The bandwidth uncertainty in a local area network can be particularly aggravated should many video communication calls be made at the same time over the local area network. Thus, even though these networks may be of substantial bandwidth, it is rare that they always have available, for a substantial time, substantial capacity, for example an additional megabit per second which would enable, at today's standards, about eight calls to simultaneously take place.

Thus, the PC environment is indeed a very different environment from that which the videoconferencing industry has typically addressed. Other videoconferencing environments, in which data throughput, whether defined in terms of bandwidth or data rate, is not guaranteed include wireless and mobile communications where there is no guarantee of bandwidth or constant connection quality.

Having pointed out some of the difficulties encountered in connection with visual communications in today's personal computing network environment, it is also important to note that there are factors which are both advantageous and not available in group videoconferencing where telephone line communications are in effect. The first is a possibility of using a variable bit-rate encoding. This eases the requirements imposed on a videoconferencing system for precise control of the bit-rate. This is often a difficult design issue for a wide area network (WAN) based system. In such a system, there is an absolute "maximum" bit-rate available, a rate which cannot be exceeded. Another positive consequence is that with some variation in transmission bit-rate, when the network is not congested, video quality can be kept nearly constant. The second factor is that the display size in the personal videoconferencing is small, and accordingly helps to hide some coding artifacts that become annoyingly visible on a large (thirty inch) screen.

It is therefore an object of the invention to provide visual communications in a scalable network environment in which there is no guaranteed bandwidth or connection quality, such as a packet-switched network in today's personal computing environment which is flexible in utilizing network bandwidth and terminal capability. Other objects of the invention are videoconferencing in a scalable network environment in which there is no guaranteed bandwidth or connection quality, such as a packet-switched network, personal computing environment, while providing transmission error resilience, adaptability to the resources which are available, and graceful degradation when those resources are restricted.

SUMMARY OF THE INVENTION

The invention relates to a method and apparatus for providing improved video conferencing between at least two terminals connected over a scalable network in which there is no guaranteed bandwidth or connection quality, such as a packet-switched network, for example a metropolitan area network or a local area network. The method of the invention features encoding, at one terminal, an image sequence for transmission onto the network whereby the image sequence can be decoded at any of the other terminals on the network at at least two different spatial resolutions and at least two different frames rates. The method further features decoding the encoded image at at least one other terminal at a selected spatial resolution and frame rate and displaying the decoded image sequence at the selected resolution and frame rate.

The method also features encoding a difference image representing the difference between the current frame to be encoded and a reference frame, and generating the reference frame using at least one temporally earlier frame selected from, among other standards, a previously reconstructed frame which occurs no more than a predetermined fixed number of frames earlier than the current frame.

In various aspects, the invention further features decoding the encoded image sequence at different frame rates at different terminals, decoding a received image sequence at a frame rate different than the encoding frame rate at the same terminal, decoding the encoded image sequence at different spatial resolutions at different terminals on the network, and decoding the encoded sequence at a spatial resolution different than the encoding spatial resolution at the decoding terminal.

In another aspect of the invention, the method features encoding a difference image representing the difference between the current frame and an upsampled representation of a spatially lower resolution reconstructed frame, and generating an encoded data stream separably decodable at at least a lower and a higher spatial resolution, the lower resolution being decodable without decoding any portion of the datastream corresponding to the higher resolution encoding.

The method also features dividing the image into a plurality of blocks and for each block selecting from a plurality of reference blocks a temporal prediction of the block. Preferably, one of the reference blocks can be generated by a non-overlapping motion compensation method.

In another aspect, the method of the invention features encoding, at at least two terminals, respective image sequences for transmission onto a scalable network in which there is no guaranteed bandwidth or connection quality, such as a packet-switched network for decoding at any of the other terminals on the network at any of at least two spatial resolutions and at least two frame rates. The method further features decoding, at at least one terminal, the encoded sequences from at least two other terminals at a selected frame rate and spatial resolution, and simultaneously displaying at the decoding terminal the image sequences from at least two other terminals at their selected spatial resolutions and frame rates.

In yet another aspect, the method of the invention features encoding, at one terminal, an image sequence into a bitstream for transmission onto a network and wherein the bitstream can be decoded at either of at least two spatial resolutions, or at either of at least two different frame rates. The method then features decoding the image sequence at the selected spatial resolution or frame rate, as the case may be, and displaying the decoded image for viewing.

In other aspects of the invention, the method features bit rate control mechanisms for providing both an average bit rate as well as a maximum network packet size.

The method of the invention also features a spatial scalability and a temporal scalability wherein partial codecs operating at different spatial resolution layers generate temporally variable, at the encoders option, bitstreams. The partial codecs are interdependent upon one another in the sense that a higher resolution codec is typically dependent upon a lower resolution partial codec. By proper control of the codecs, both spatial and temporal dependencies can be advantageously employed to enable flexible scalability of the video encoding/decoding process.

The apparatus of the invention relates to providing a video conference between at least two terminals connected over a network, such as, for example, a metropolitan area network or a local area network, and features an encoder at one terminal for encoding an image sequence for transmission onto the network wherein the sequence can be decoded at either of at least two spatial resolutions and/or either of at least two frame rates. The apparatus further features a decoder for decoding the encoded image sequence at at least one other terminal at a selected spatial resolution and frame rate depending upon the computing capabilities of the terminal and a display for receiving the decoded image sequence and displaying it for viewing at the selected resolution and frame rate. The apparatus further features circuitry for accomplishing the various method steps described herein before.

BRIEF DESCRIPTION OF THE DRAWINGS

Other objects, features, and advantages of a preferred embodiment of the invention will be apparent from the following description taken together with the drawings, in which:

FIG. 7 is a block diagram of a layer 1 hybrid coder structure in accordance with the invention;

FIG. 8 is a diagrammatic representation of the construction of the C component according to a particular embodiment of the invention;

FIG. 16 illustrates the effects of various parameter settings for refreshing image frames in the sequence;

FIG. 18 is a table illustrating the results of the operations of FIG. 17;

DESCRIPTION OF A PARTICULARLY PREFERRED EMBODIMENT

The invention being described hereinafter can be implemented in either hardware, software, or a combination of the two. In the description provided, it will be apparent to those practiced in the computer arts that various combinations of hardware or software might be useful. In a preferred embodiment of the invention, all of the functions are performed in software in accordance with the description as follows.

General Operation

Figure 1:
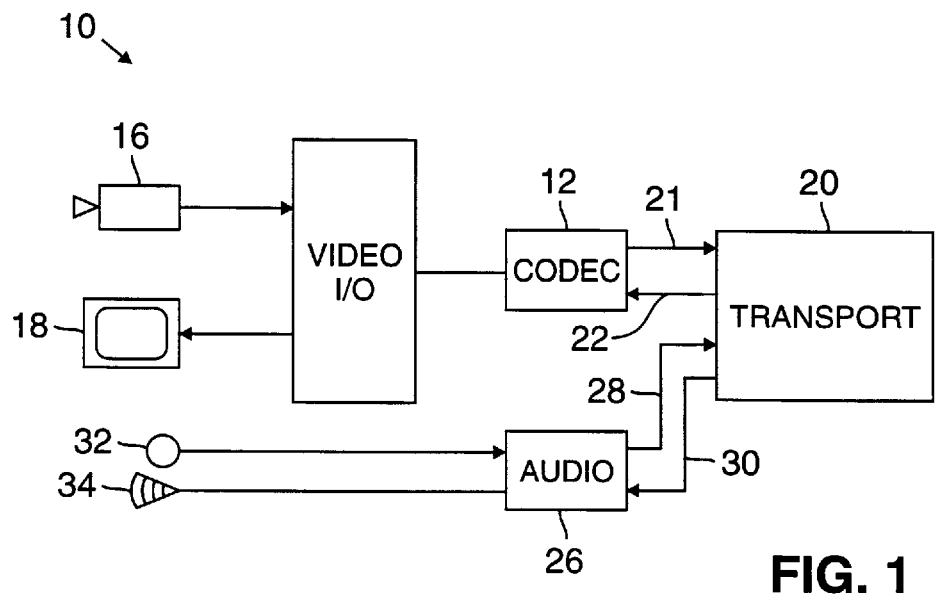
FIG. 1 is a functional block diagram of the PC terminal videoconferencing system in accordance with the invention.

A typical personal computer videoconferencing system 10, functionally illustrated in FIG. 1, has a video codec 12, which compresses video digital information provided by a video input/output system 14. The video input/output system 14 receives video from a camera 16 and displays video on a display 18. The video codec communicates with a network transport system 20 over a line 21 and which also provides video information from the network to the codec over a line 22. The transport system 20 also receives audio data from an audio system 26 over a line 28, and provides audio data to the audio system over a line 30. The audio system receives analog audio signals from a microphone 32 and provides analog audio output to a speaker 34.

In accordance with the preferred embodiment of the invention, the video codec and an audio processing system are implemented in software and operate using the personal computer's CPU, bus, memory and network interface. Commercially available audio and video capture cards provide an interface to the microphone, speaker, camera and display.

Figure 2:
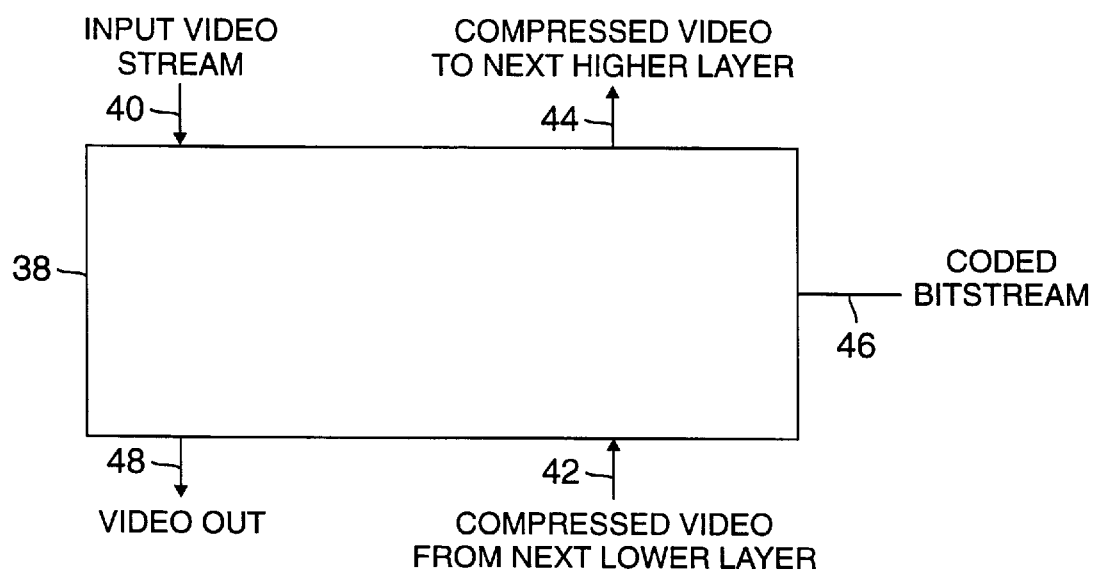
FIG. 2 is a diagrammatic representation of each partial codec layer in accordance with a preferred embodiment of the invention.

The video codec, in the illustrated embodiment, uses a hierarchical or layered structure in the spatial domain. That is, it performs video encoding at several spatial layers or resolutions which, in the illustrated embodiment, are dependent upon each other. In the illustrated embodiment, there are three layers although the number of layers can be easily extended or reduced. The "partial" codec, at each layer, can be considered a functional box having five input/output connections, as illustrated in FIG. 2. Thus, at each layer, the codec 20 can be viewed as a partial codec 38 having an input video stream at that spatial layer (resolution) over a line 40, and a compressed video stream from the next lower layer (at its lower resolution), if any, over a line 42. The partial codec at layer n then provides a compressed video output over a line 44, a coded bitstream representing that layer's image over a line 46, and an input video stream to the lower layer, if any, over a line 48.

The input and output video signals, and the compressed video signals, are all in YUV format. Y corresponds to the luminous component, and the U and V correspond to the chrominance components. In the illustrated three layer embodiment, the spatial resolutions, in pixels (picture elements), are as follows:

|         | Y        | U        | V        |
|---------|----------|----------|----------|
| Layer 3 | 320 × 240 | 160 × 120 | 160 × 120 |
| Layer 2 | 160 × 120 | 40 × 30   | 40 × 30   |
| Layer 1 | 80 × 60   | 20 × 15   | 20 × 15   |

Figure 2A:
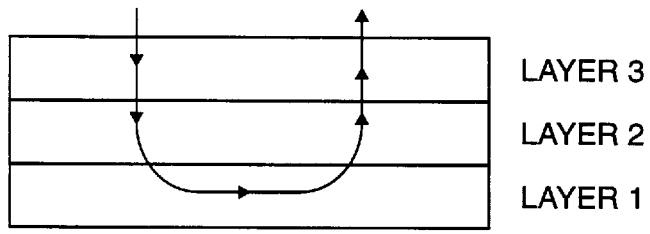
FIG. 2A is a diagrammatic representation of the data flow dependencies in a multilayer spatially dependent encoder in accordance with the invention.

Referring to FIG. 2A, the video codec 12, having three layers and hence three partial codecs 38, operates in a recursive fashion. The layer three partial codec takes one frame of raw video from the camera and downsamples it to the resolution of layer 2 and then sends it to the layer 2 partial codec. The layer 3 coding process begins as soon as the layer 2 partial codec returns to the layer 3 partial codec the layer 2 compressed video. This is required since the layer 3 partial codec operates using both the layer 3 input picture (at its higher resolution) and the layer 2 compressed image. The layer 2 partial codec repeats the same procedure with respect to the layer 1 partial codec. The layer 1 partial codec, since it does not have to wait for a lower layer to provide a compressed video image, proceeds to process the video from layer 2 upon receipt of the video frame from layer 2 and to compress the received downsampled input picture.

Referring still to FIG. 2A, the three partial codec layers are stacked together to form a complete codec. The video data flow is also illustrated. As illustrated, there is only higher layer to lower layer dependency, while the dependency does not work in the opposite direction except for the receipt of the input video. Thus, from the nature of the data flow and the spatial recursive nature of the codec, the system can operate in certain "partial" configurations. For example, a codec can operate with only layers 1 and 2, or with layer 1 alone, as long as the input video is properly sampled. Thus, there are three operational modes for the system of FIG. 3:

Mode 1: layer 1

Mode 2: layer 1 and layer 2

Mode 3: layer 1, layer 2, and layer 3

Figure 20:
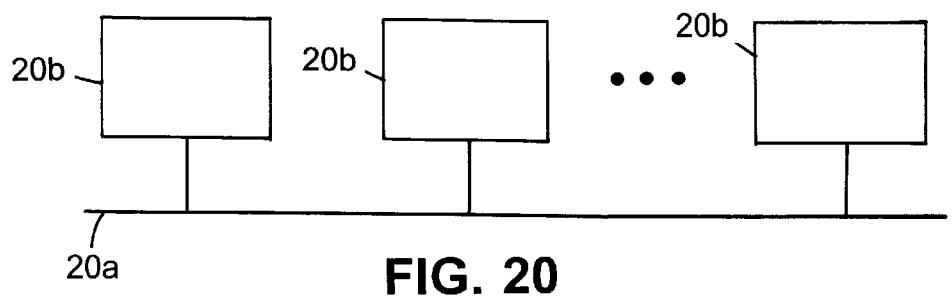
FIG. 20 illustrates a multicast wired networked videoconference system according to the invention.
Figure 21:
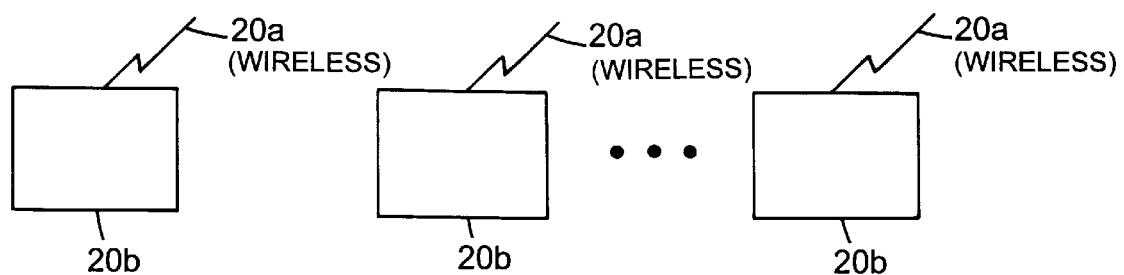
FIG. 21 illustrates a multicast wireless networked videoconferencing system according to the invention.

As will become apparent hereafter, when the encoder is operating in mode 2 or mode 3, its decoder, or a decoder operating upon the output of that particular encoder at a remote site, can decode the bitstream in different ways. Thus, the lower layer's information is embedded in the bitstream in both modes 2 and 3, and a decoder, should it be necessary, need only extract and decode that part of the bitstream up to the layer which it desires to display. For example, if an encoder is running in mode 3, a decoder receiving that encoder's bitstream, can choose to decode and display only the information needed for a level 1 display, a level 2 display (in which case layer 1 is also decoded but will not be separately displayed since the layer 1 information is used only in combination with, and for decoding, layer 2), or layer 3 (in which case both layers 1 and 2 are decoded, but not displayed for the reason noted above). Since the coding and decoding at a lower layer needs less computing power than coding and decoding at a higher layer, this feature allows computer terminals with different computing capability, or computer power (resource) availability, to communicate with each other. In particular, in a point to point video conference, the operating mode will be decided by the lower capability of the two video computer terminals. However, referring to FIGS. 20 AND 21, for a multipoint call (multicast on the local area network 20a, wired (FIG. 20) or wireless (FIG. 21)), with terminals 20b having mixed capabilities, each encoder can encode at the mode corresponding to its best capability without concern whether other terminals will be able to receive at that level. Rather, each decoder will then decode to its best capability. This means that the encoder and decoder, even within one computer terminal, do not have to operate at the same level. This flexibility allows one terminal to send, for example, a mode 3 bitstream while using the remaining computing power available to it to decode several incoming bitstreams only at level one, and to display them all on the monitor; so that in this multipoint communication, each party can see all of the other parties involved in the conference call.

What has been described so far relates to a spatial scalability, that is, the ability of the encoder/decoder to individually and selectively, on both the encoding and decoding steps, choose the level of resolution which the codec will use. As noted above, this is typically based on the resources of the computer terminal. In addition, the codec has still further flexibility in that it has a temporal scalability as well. This means that the decoder need not decode every frame in the bitstream for the purpose of tracking the encoder, if the encoder is also operating in a temporally scalable mode. To understand this capability, referring to FIG. 3, the further details of the codec structure must be understood.

Figure 3:
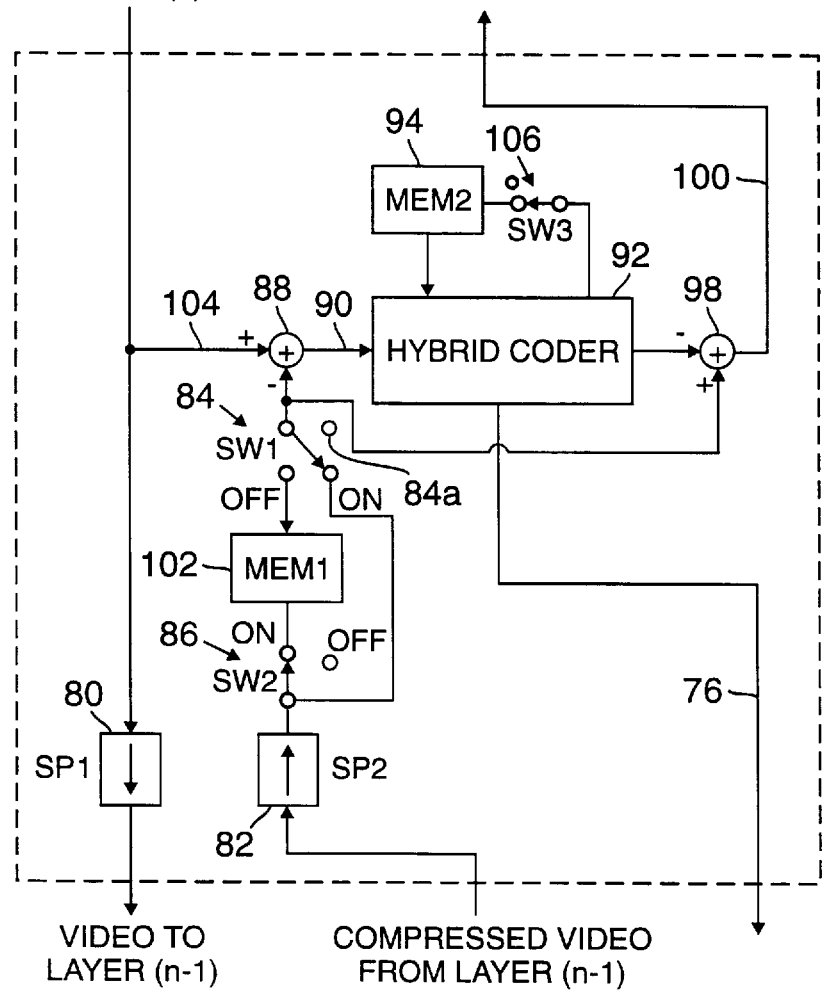
FIG. 3 is a more detailed block diagram of a single layer encoder in accordance with the invention.

Referring to FIG. 3, the structure of each partial or single layer codec is substantially the same. Each codec layer has a downsampling filter 80 which converts the spatial resolution for the digital video input from layer (n) to the digital video resolution required for layer (n–1). The partial codec further has an upsampling filter 82 to interpolate the digital video reconstructed output frames from layer (n–1) and to generate from it a digital video at the layer (n) resolution. Both of these functions are omitted in the layer one partial codec which is already at the lowest layer. One other difference is that the chrominance processing in these blocks is slightly different, in the illustrated embodiment, between layers 2 and 3. This is evident from the table above, which shows that layer three has a 4:1:1 format YUV but that layers 1 and 2 each have a 16:1:1 YUV format. Therefore, the filters 80 and 82 in the layer 3 partial codec have to perform a conversion between the 4:1:1 and 16:1:1 format at levels 2 and 3 respectively.

When switch 84 is in the through or "on" connection mode, as illustrated in FIG. 3, the upsampled lower layer frame is subtracted from the current layer's video input, using a subtractor 88, resulting in a high-pass differential picture with detail information, such as edges, on lines 90. This picture is then coded by a hybrid coder 92 (described in further detail below). This coder has a structure similar to that used in various well known coding algorithms such as the CCITT standard H.261. It has a temporal predictor that uses past information (previously coded frames generated by the coder and stored in a memory 94) to form an estimate of the current input frame by means of motion estimation and compensation. The resulting prediction residual error is then quantized in an intraframe fashion. The information needed to reconstruct the compressed high-pass frame, the frame represented on line 90, is contained in a bitstream over lines 96 and the resulting compressed high-pass image is added to the upsampled lower level compressed image in an adder 98 to form a complete (reconstructed) compressed image at the current level over a line 100. Thus, it should be clear that the total output of the codec comprises the bitstream over line 96 from each of the three layers, the lower resolution layer 1 information, and the high-pass information to upgrade the lower level resolution image which is provided respectively by layers 2 and 3. This method can be called progressive transmission.

Still referring to FIG. 3, a frame memory 102 stores the up-sampled lower layer compressed frame if switch 86 is turned on (as illustrated in FIG. 3). However, this interlayer dependency (which of course does not exist at layer 1) can have a temporal delay should switches 84 and 86 be turned off for specific frames (for example, every other frame). When switches 84 and 86 are turned off, the most recently stored lower layer frame in a memory 102 is used again, as the previous lower level resolution frame information. Correct use of switches 84 and 86 thus will allow different layers to encode (and at the receiver decode) at different frame rates, and thereby provides some temporal scalability. If switch 84 is turned to an unconnected node 84a, then no lower layer frame will be subtracted from the input video over a line 104; and in this case, the interlayer dependency is broken and all information needed to reconstruct a current layer frame, is contained in the frame's own bitstream. This added flexibility can be useful for combatting transmission error, for example, packet loss on a local area network.

As noted above, frame memory 94 is used to hold the reconstructed compressed high-pass image at the current level. (The uncoded image appeared on line 90.) When a switch 106 is opened, a newly compressed high-pass image will not be stored in memory 94. This means that the earlier compressed high-pass image that is already in the memory will be used for coding the next frame. The frames which are put into memory 94, or memory 102, are called "sticky frames". Consistent with the "sticky" frame concept, it will be apparent to those familiar with the H.261 standard that every frame is a sticky frame. It should also be clear that any method which does not make every frame a sticky frame will lose some coding efficiency; however, the trade-off is that we are adding flexibility to the system by using the temporal scalability concept. This concept thus allows a slow decoder to save computing cycles by decoding only sticky frames, and it is important to note that the decoder must decode all sticky frames or risk losing continuity of the video signal. In the illustrated embodiment, each sticky frame is flagged, and in fact the sticky frames at different layers are completely independent so that they need not all be "sticky" at the same time.

Figure 5:
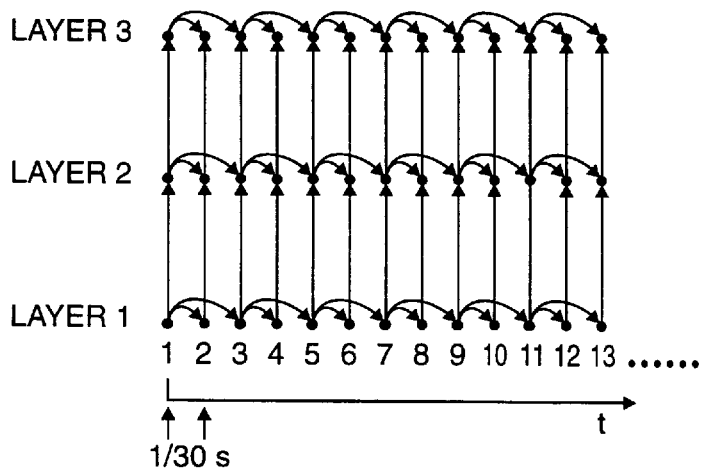
FIG. 5 illustrates a second video data dependency relationship between layers and frames.
Figure 6:
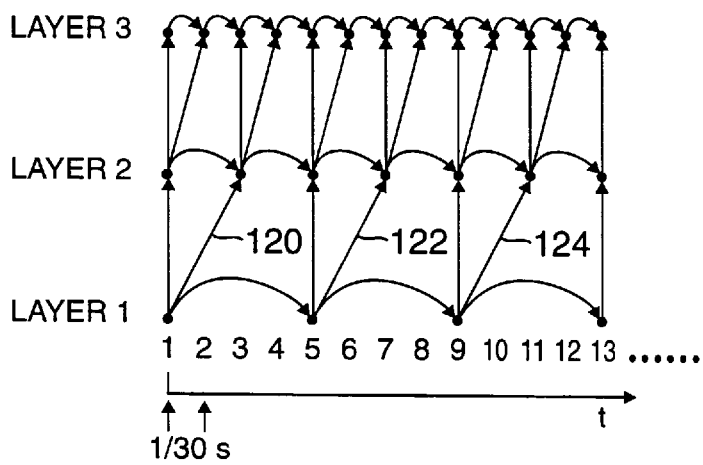
FIG. 6 represents yet another video data dependency relationship between layers and frames.

When combined, the spatial and temporal scalability provides substantial flexibility to the video communications system which enables the system to adapt to different network and terminal conditions. Several different examples are illustrated in FIGS. 4, 5 and 6.

Figure 4:
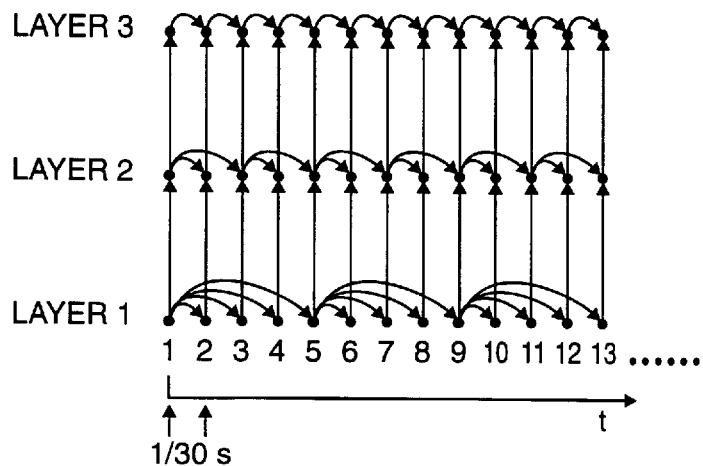
FIG. 4 illustrates the video data dependency relationship between layers and frames.

Referring to FIG. 4, there is illustrated, diagrammatically, the operation of a video codec which is transmitting 30 frames per second at each layer. The horizontal axis represents time while the vertical axis represents the operation over time at a particular layer. Each dot represents an image frame and the arrows show the dependency of an encoded frame upon either a prior encoded frame at that layer, or an encoded frame at a previous layer or both. (The video data flows from the tail of the arrow to its head.)

In the illustrated embodiment, the vertical arrows, representing interlayer dependency, are all pointing from a lower layer to a next higher one at the same frame time, indicating that lower level information for that frame is used in encoding the higher level information, and correspondingly, that the lower level information for the frame is needed for decoding the higher level. This corresponds to switches 84 and 86 being closed or on. In layer 1, frames 1, 5, 9, 13, . . . are the so-called sticky frames, frames which are used in encoding other frames for that level. Thus, in layer 1, frames 2, 3, 4, and 5 are all predicted by frame 1; and frames 6, 7, 8, and 9 are predicted by frame 5, which replaces frame 1 as the sticky frame.

For layer 2, every other frame is a sticky frame so that frames 1, 3, 5, . . . are the sticky frames. Accordingly, each sticky frame, at layer 2, is used only to predict two subsequent frames; that is, frames 2 and 3 depend on frame 1, claims 4 and 5 depend on claim 3, and so on. Every frame in layer 3 is a sticky frame, and accordingly, every frame depends upon the frame immediately prior to it.

If the decoder is only decoding the layer 1 bitstream, it can choose to decode only the sticky frames, frames 1, 5, 9 and 13 . . . for a 7.5 frame/second sequence. Alternatively, and with additional computing capacity, it can decode additional frames, for example, all odd numbered frames for a 15 frame/second sequence, or all frames for a 30 frame/second image sequence. In a similar manner, the decoder operating at layer 2 can choose between 15 and 30 frames/second for its decoded image. At layer 3, there is no choice but to provide 30 frames/second.

Referring now to FIG. 5, all even frames, at all layers, can be discarded while all odd frames, at all levels, are, as shown, sticky frames. In other words, the even numbered frames do not have to be decoded by the partial video codec at any layer and accordingly, the decoder can operate at 15 frames/second, at any layer, or at 30 frames/second, at any layer. The choice either will depend upon the settings of the codec or can automatically be selected depending upon the load on the CPU.

Referring now to FIG. 6, the encoder at each layer is operating at a different frame rate. At layer 1, the decoder is operating at 7.5 frames/second; at layer 2, the encoder is operating at 15 frames/second, and at layer 3, the encoder is operating at 30 frames/second. In addition to the vertical (spatial) and horizontal (temporal) dependencies noted above in connection with FIGS. 4 and 5, there is additionally a diagonal flow illustrated by the data flow lines 120, 122 and 124, which indicate a simultaneous spatial and temporal dependency. Having described the operation of the codec generally, the hybrid decoder 92 is described in more detail to illustrate its operation and flexibility.

Hybrid Encoder-Layer 1

Referring now to the hybrid encoder used at the lowest layer, layer 1, and referring to FIG. 7, the layer 1 video input over a line 130 from a layer 2 downsampling filter is in a 16:1:1 YUV format. Each pixel, for each component, is represented by seven bits. Before the three video components are coded, the two chrominance components (U and V) are first combined into a single "C" component. This is effected by flipping the V component vertically, in a V flipping circuitry 132, and appending it to the bottom of the U component as illustrated in FIG. 8. That is, the U component is represented by an array, at layer 1, having 15 rows and 20 columns. The V component is also represented by such an array. When the two are combined, as illustrated in FIG. 8, the rows of the V component are reversed, so the bottommost row of the U component is adjacent to the bottommost row of the V component, and the bottom row of the C component is the first or top row of the V component. Thus, the output of the V component flipping circuity 132, over a line 134, is the input frame stored in two arrays: an 80×60 Y component array and a 20×30 C component array. The compression is performed separately and independently on each of the two arrays. Since there is no fundamental difference in the process, in the following discussion, only the Y component will be considered.

Figure 9:
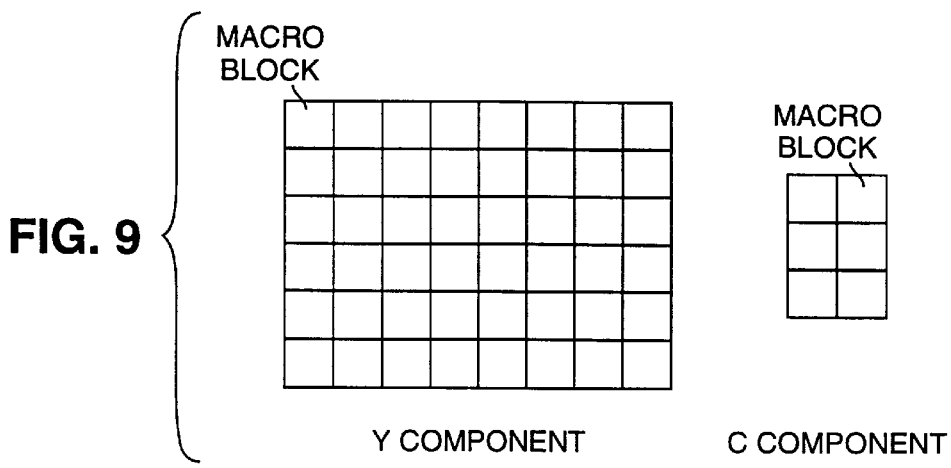
FIG. 9 is a diagrammatic representation of the macroblock structure of the Y and C components in accordance with the invention.
Figure 10:
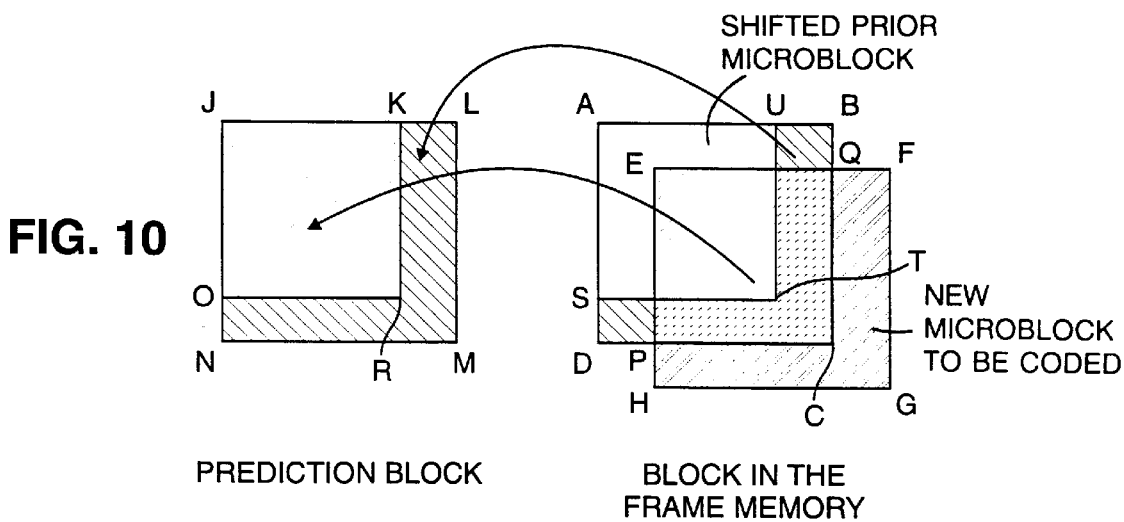
FIG. 10 is a diagrammatic explanation of the operation of the non-overlapping motion compensation method in accordance with the invention.

The temporal prediction of the Y component is performed in a temporal predictor 145 on a so-called macroblock basis using the frame memory 94. The frame memory is set to 0 prior to coding the first frame of a sequence. Each macroblock contains a 10×10 group of pixels. The pixel is defined at the resolution of the particular layer and therefore, the Y component at layer 1 has 48 macroblocks (eight columns by six rows corresponding to an 80×60 pixel array) and the C component has 6 macroblocks (two columns by three rows corresponding to a 20×30 pixel array) as illustrated in FIG. 9. A prediction of a macroblock is then another macroblock which matches the input macroblock in some optimum way. In the illustrated embodiment, there are four temporal prediction modes which can be used for the prediction of a macroblock. They are:

1. Mode 0—Intra-frame: In this mode, the prediction block contains pixels all of which have a 0 value.
2. Mode 1—Inter-frame: In this mode, the macroblock used as a prediction or reference block is the macroblock at the same spatial location stored in frame memory 94.
3. Mode 2—non-overlapping motion compensation: In this mode, the prediction block is formed by shifting the corresponding macroblock stored in frame memory 94. For those pixels in the prediction block that would have come from outside of the shifted block if they were available, (that is, from macroblocks adjacent to the shifted prediction macroblock), the prediction block uses the pixels in the same locations in the unshifted prediction block. This is illustrated in FIG. 10, as described below.
4. Mode 3—overlapping motion compensation: In this mode, the prediction block is formed by shifting a 10 by 10 block (which may straddle several macroblocks) from the frame memory 94. In the case that the pixels outside the frame boundary are needed, (because there are no pixels available outside the frame boundary for those edge macroblocks being coded), the same procedure used in mode 2 is applied.

Referring to FIG. 10, the prior macroblock contained in frame memory 94 is described by the block labelled ABCD in FIG. 10. The current macroblock to be encoded is described as a square labelled EFGH in FIG. 10 and the resulting prediction macroblock is denoted by the letters JKLMNO in FIG. 10. The prior block ABCD is shifted relative to its original location until an optimum shift location is determined. At this location, there is a best match between a portion of the prior block and a portion of the current macroblock, that portion being labelled PEQC. That portion, PEQC, of prior block ABCD, is then written in the prediction block, as illustrated in FIG. 10, at the location of the match (relative to current macroblock EFGH), and as labelled OJKR. The remainder of the prediction block, in accordance with the invention, which corresponds to the non-matching portion of the current macroblock to be encoded (non-matching because the pixels lie outside of the boundary of the shifted prior macroblock) is replaced with the pixels of the prior macroblock with that macroblock being unshifted. This corresponds, in this illustrated embodiment, to the L-shaped portion labelled DSTUBC. This L-shaped portion is then moved and completes the prediction block as the section labelled ORKLMN.

For each frame, the prediction modes that can be used for all macroblocks are specified in a bitstream header. In the illustrated embodiment, there are four possible combinations of allowed prediction modes. They are:

1. Combination 0: this combination includes mode 0 only. This means that the prediction mode for each macroblock does not need to be specified one by one and that the whole frame is coded without using any prior information.

2. Combination 1: In this combination, both modes 0 and 1 are allowed and one bit of information regarding each macroblock must be sent in the bitstream header.
3. Combination 2: In this combination, modes 0, 1, and 2 are allowed. This combination will likely be used most often and achieves excellent prediction efficiency without causing any transmission error propagation between adjacent blocks, since in the motion compensated mode 2, the compensation is nonoverlapping.
4. Combination 3: In this combination, modes 0, 1, and 3 are allowed. This mode has less resilience with regard to transmission error propagation, but mode 3 provides better coding efficiency than mode 2.

While there can be many different approaches to determine which is the best prediction mode for each macroblock when more than one prediction mode is allowed, in the illustrated embodiment, a mean-square-error criterion is employed. In connection with mode 2, the method described in connection with FIGS. 17 and 18 below is particularly advantageous since an element of the array resulting from the FIGS. 17 and 18 method will contain the sum of the mean-square-errors for the many elements of, for example, an L-shaped section of image differences.

After the entire prediction frame is generated, macroblock by macroblock, it is subtracted from the input frame at a subtractor 146 and the resulting residue image, the error image, is encoded. The residue image is first scaled before a quantization encoding procedure is performed. The scaling factor is determined at 148 by measuring the residue energy. After a common scaling factor for all macroblocks is determined, every residue pixel, except those in the macroblocks with prediction mode 0, is divided by the scaling factor. For mode 0 macroblocks, the scaling factor is reduced by half, to a minimum value of "one", to reduce the coding artifacts when mode 0 is used to refresh the image, for error resilience purposes. The scaling process controls the overall video quality of the image. There is thus a trade-off between video quality and bit rate. The system can be operated in either a constant average bit rate mode or a variable bit rate mode, depending on network conditions. So long as the network is not congested, the variable bit-rate mode offers better video quality in our experience.

Figure 11:
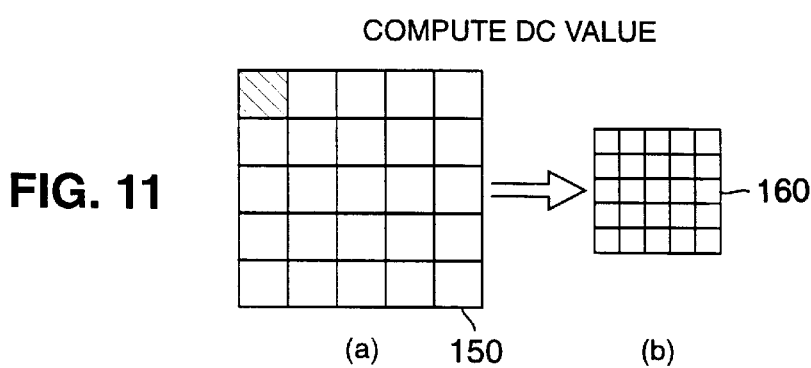
FIG. 11 is a diagrammatic representation illustrating microblocks in DC array generation.

The quantization is performed first at a DC level and then at an AC level on a macroblock by macroblock basis. Each macroblock of the residual, and now scaled, error frame is first divided into twenty-five 2 by 2 microblocks as illustrated in FIG. 11, wherein the left hand larger figure shows a 5 by 5 array of microblocks representing a 10 pixel by 10 pixel array macroblock 150. The mean or average (DC) value of each microblock is then determined. The 25 DC values then form a 5 by 5 array as illustrated at 160.

In the illustrated embodiment, two quantization methods can be used to quantize the DC values. One is pulse code modulation (PCM) and the other is differential pulse code modulation (DPCM), both of which are well known in the art. The purpose of using one of these two quantization modes is to obtain a higher compression gain. The PCM mode works better when the values are not highly correlated, while the DPCM method is more efficient during the buildup of a picture when the signals have a higher correlation. In both modes, the quantized information is a variable length coded (VLC). There is one bit for each macroblock to indicate whether DC information is present; and if it is present, there is a second bit which indicates which quantization method has been used.

When the DC quantization is completed in block 162, the quantized DC values are then up-sampled back to a 10 by 10 macroblock using a separable four tap FIR filter whose coefficients are: 0.25, 0.75, 0.75, 0.25. The up-sampled DC macroblock is then subtracted, using a subtractor 164, from the original residue error macroblock, on a macroblock by macroblock basis, resulting in an AC error macroblock signal over a line 166. The AC quantization is performed also on a microblock by microblock basis in AC quantizer 168. Each (two pixel by two pixel) microblock is quantized with a vector quantizer (VQ). In the illustrated embodiment, the vector quantizer is tree structured with 256 code vectors. The tree has a branching factor of four, meaning that four levels of search are needed to traverse the tree.

Like the DC quantization, there is provided in the bitstream one bit per macroblock to indicate if any AC information is present. When there is AC information present, 25 more bits will be sent, one for each microblock, where in the illustrated embodiment, a "one" means that the AC value is non-zero and the AC code vector index information will follow, while a zero indicates that the AC value is zero. The vector quantization code vector indices can be transmitted in one of two ways—either by variable length coding (VLC) or by fixed length coding (FLC). In this embodiment, the decision of whether to use VLC or FLC is made once for an entire frame and can be identified in the bitstream header. Each method of transmission has advantages and disadvantages. For example, the variable length code is good for a high compression ratio while the fixed length code is good for low coding/decoding complexity and error resilience. The choice of the two coding methods adds flexibility to the codec.

In order to avoid splitting of packets due to a network imposed maximum packet size, (the Ethernet, for example, has a maximum packet size of 1500 bytes), the system must control the maximum number of bits for every coded frame to be below, for example, 1400 bytes, so that all bits, including overhead bits, can be packed into one packet. Although the scaling process can achieve average bit rate control, it does not provide a guarantee that the number of bits for every frame will be below the 1400 byte limit (for the Ethernet, for this illustrated embodiment). Therefore, additional steps, which in the illustrated embodiment remove some of the AC information, are added to reduce the total number of bits where necessary. These steps are described in more detail below.

A bitstream generation element and mixer, multiplexor 179, combines the bit information from the temporal predictor, the scaler, and the DC quantization and AC quantization elements to generate the bitstream output from the layer 1 hybrid coder structure over a line 96a. The bitstream over line 96a will be organized by the system into one network packet, and then will be sent over the network.

Referring to FIG. 7, the reconstructed frame output from the AC quantizer over a line 180 is added to the reconstructed frame from the DC quantizer over a line 182 and the sum from a summer 184 is inversely scaled by an inverse scaler 186 to provide, in combination with the temporal prediction over a line 188, a reconstructed frame over a line 190. If switch 192 is in the "on" or through position, as illustrated in FIG. 7, the reconstructed frame is stored in the frame memory 94. When stored, it becomes a sticky frame as described and discussed above. If the new frame is not stored in frame memory 94, then that memory contains an earlier frame which is the sticky frame to be used in coding the next video frame (and the current frame output by the hybrid coder is lost to the encoder).

The C component is encoded in the same manner as the Y component. Its compressed bits are appended after the Y component bits in the bitstream, and are not intermixed with each other as in the H.261 standard. Thereby, a decoder can choose whether or not to decode the chrominance information. This further flexibility can be based upon whether a black and white picture is good enough for the current purpose. This also provides yet further flexibility to the system and can save both coding time and computing resources in the PC video terminal. In addition, by avoiding the additional decoding step, the delay in making the image available on the terminal is also reduced.

Hybrid Encoder—Layers 2 and 3

Figure 12:
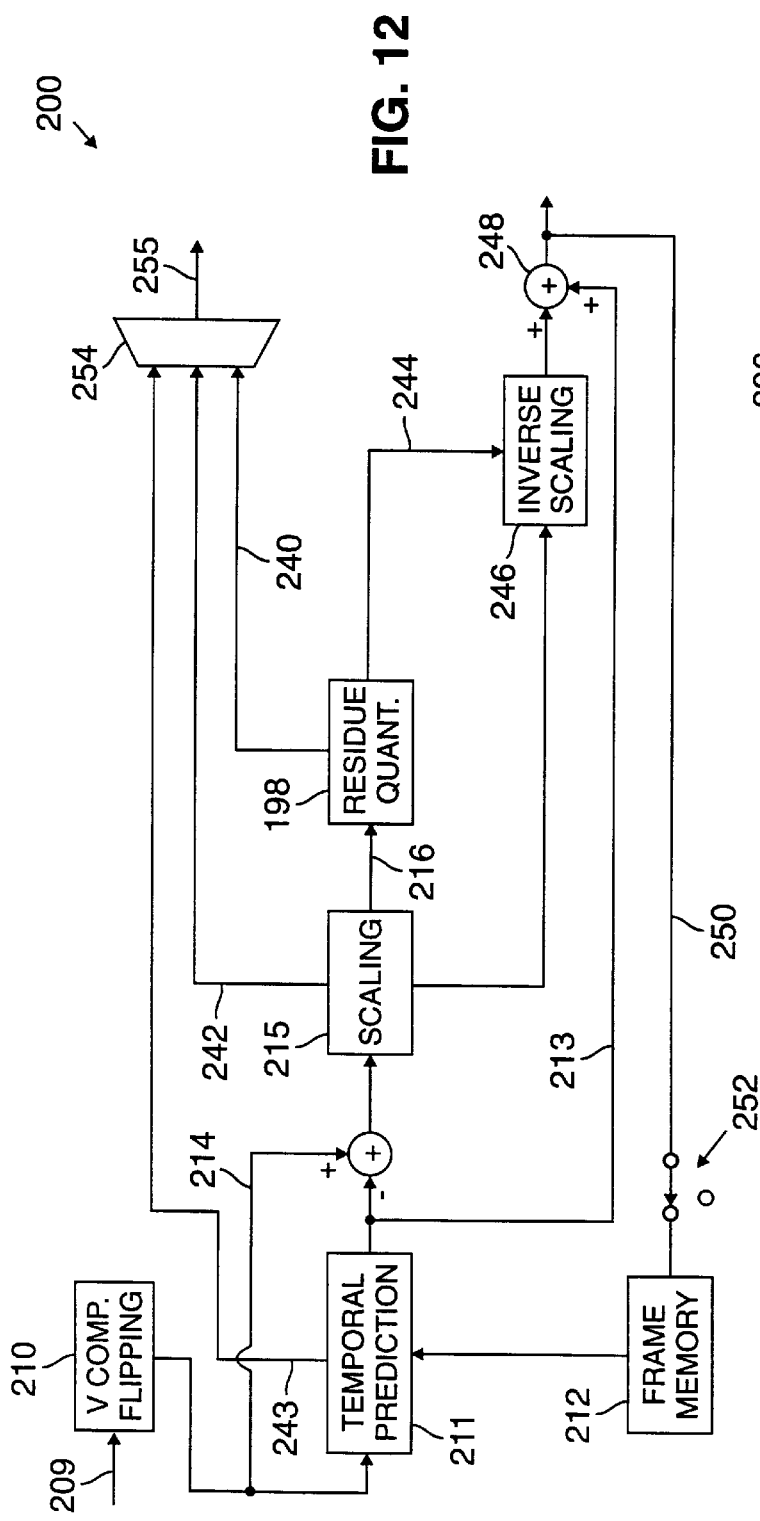
FIG. 12 is a block diagram of a layer 2 hybrid coder structure in accordance with the invention.

Referring to FIG. 12, the layer 2 coder has a structure very similar to that of the layer 1 coder, except that the residual error quantization performed both in DC and AC modes in the layer 1 hybrid encoder structure is, in the layer 2 hybrid encoder structure, simply an AC quantization, represented in the layer 2 structure by a residue quantizer 198. Each pixel, for each component, is again represented by seven bits. In connection with the layer 2 hybrid coder structure 200, a new concept, designated a group of macroblocks (GMP) is introduced. A group of macroblocks is a 20 by 20 block of pixels (at the layer 2 resolution). The layer 2 frame can thus be divided into GMPs in the same way that a layer 1 frame is divided into macroblocks, since the block size and the frame size scale proportionally. This also means that there is a one to one physical correspondence between every GMP in layer 2 and every macroblock in layer 1; that is, the physical boundary of the GMP is identical to the physical boundary of a corresponding macroblock at the lower layer even though the number of pixels in each, which are to be encoded, is different. A GMP can thus be divided into four layer 2 (10 pixel by 10 pixel) macroblocks. These can be referred to as children of that macroblock in layer 1 which corresponds to the layer 2 GMP.

Figure 13:
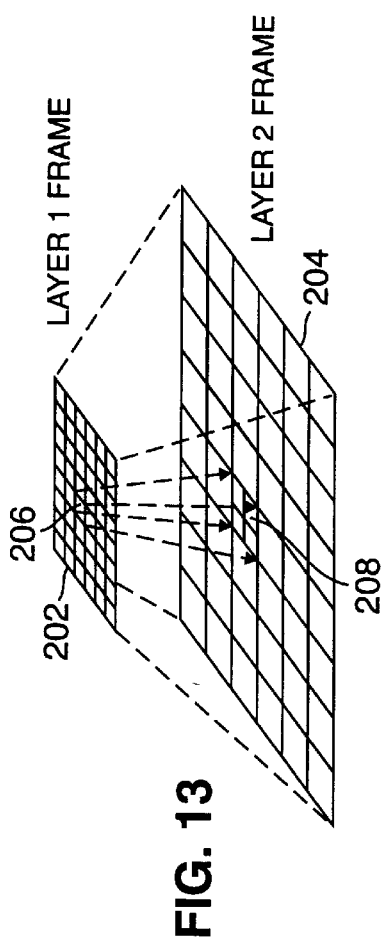
FIG. 13 is a diagrammatic representation of the parent-child relationship between layer 1 macroblocks and layer 2 GMP's.

Referring to FIG. 13, the relationships between a layer 1 frame 202 and a layer 2 frame 204 (both having the same physical size and boundary) and a macroblock 206 of the layer 1 frame and a corresponding GMP 208 of the layer 2 frame are illustrated. As with the layer 1 frame, the discussion of the layer 2 hybrid codec structure will focus on the Y component of the layer 2 frame. The C component of the layer 2 frame is processed in the same manner.

The temporal prediction in the layer 2 partial codec is performed on a macroblock by macroblock basis in the temporal predictor. Some prediction mode information from the lower layer, layer 1, is used to help reduce both the computational load and the number of bits needed to specify the layer 2 prediction mode. Further, since the layer 2 encoding cannot begin until the layer 1 encoding is complete for the frame, and the layer 2 decoder needs to decode the layer one video, there is no violation of causality here.

The four macroblocks within one GMP are treated together because they share the same macroblock parent in layer 1; and therefore share the same layer 1 prediction mode information. As in connection with layer 1, there are four possible temporal prediction modes for each macroblock. They are:

1. Mode 0—Intraframe: In this mode the prediction macroblock contains all zeros.
2. Mode 1—Interframe: In this mode the prediction macroblock is the same the macroblock at the same spacial location from the frame memory for the previously stored sticky frame.
3. Mode 2—Layer 1 Motion×2: In this mode, the motion vector from the layer 1 parent macroblock is scaled by two and used for layer 2 motion compensation, either in an overlapping or non-overlapping fashion (whichever was used in layer 1).
4. Mode 3—Layer 1 Motion×2+a Delta: In this mode, the motion vector from the layer 1 parent macroblock is scaled by two; and a small correction vector, whose X and Y components are in the range [−1, 1], except for the 0 combination [0,0], is added to the layer 1 scaled motion vector. The layer 2 motion compensation is in either an overlapping or non-overlapping fashion (corresponding to the layer 1 compensation for the parent macroblock).

Since both mode 2 and mode 3 are possible only if the layer 1 parent macroblock was motion compensated, this category can be broadened somewhat by including mode 1 interframe blocks of layer 1 whose motion information is considered to be [0, 0]. Further, in a manner similar to layer 1, the layer 2 bitstream header also defines the allowed prediction modes within each frame, as follows:

1. Combination 0: In this combination only mode 0 is an allowed prediction mode. This means that the prediction mode for each macroblock need not be specified and that the whole frame is coded without using any previous information.
2. Combination 1: In this combination both modes 0 and 1 are allowed, and one bit of information is provided in the layer data stream for each macroblock.
3. Combination 2: In this mode, all four modes listed above are allowed and motion compensation is performed in a non-overlapping fashion when mode 2 and 3 are used.
4. Combination 3: In this combination, all four modes listed above are allowed and motion compensation is performed in an overlapping fashion when modes 2 or 3 are used.

Since both combinations 2 and 3 allow four prediction modes that require motion information from layer 1, they can be used only when the layer 1 bitstream header also specifies the equivalent of combinations 2 and 3.

Referring again to FIG. 12, the video input, downsampled from the layer 3 partial codec, and representing the YUV components, is provided over a line 209 and the V component is "flipped" by a flipping circuitry 210 in the same manner as was performed in connection with the layer 1 hybrid coder structure. The resulting output is provided to the temporal prediction circuitry 211 which combines the current Y and C outputs with the output of layer 2 frame memory 212 and provides the resultant temporally predicted video over a line 213. That predicted video is subtracted from the input video, as modified and appearing on a line 214 and is scaled by a scaler 215 in the same manner as layer 1 scaling was achieved. In order to save computation cycles, in the illustrated embodiment, the layer 2 scaling factor is preferably set to the layer 1 scaling factor times an adjustment factor. The adjustment factor can be and is controlled, in the illustrated embodiment, to achieve a desired average bit rate and image quality for the layer 2 system.

After scaling has taken place, the resulting output, available over lines 216, is quantized by residue quanitizer 198. This is simpler than the level 1 quantization process since only one quantizer function is implemented here. In this illustrated embodiment, residue quantizer 198 is a vector quantizer with 257 code vectors of 16 dimensions. The 16 dimension code vectors are treated as 4×4 blocks of pixels; one of them being the all 0 vector and the remaining 256 being leaves of a tree structured vector quanitizer with a branching factor of 4. None of the 256 code vectors is then the all 0 vector. The entire layer 2 residue frame is than divided into 4×4 blocks. The Y component thus contains 1200 blocks in an arrangement of 30 rows with 40 blocks in each row. The vector quantization is performed in three steps as follows.

First, all of the pixels in a block are checked to determine whether they are zero in value. Since the scaling will reduce the magnitude of the pixels and many of them are already zero, there is a relatively high probability of an all zero vector. These blocks need not go through any additional steps since they will be represented by the all zero code vector. Next, each 4×4 block with at least one non-zero pixel is quantized using the tree structured vector quantization. This is a well known process. Finally, for each vector quantized block, the quantization error, measured as a mean square error, is compared to its energy. If its energy is less than the quantization error, meaning that the all zero vector is a better approximation to the block, the block will be quantized using the all zero vector instead of the vector chosen from the tree.

Figure 14:
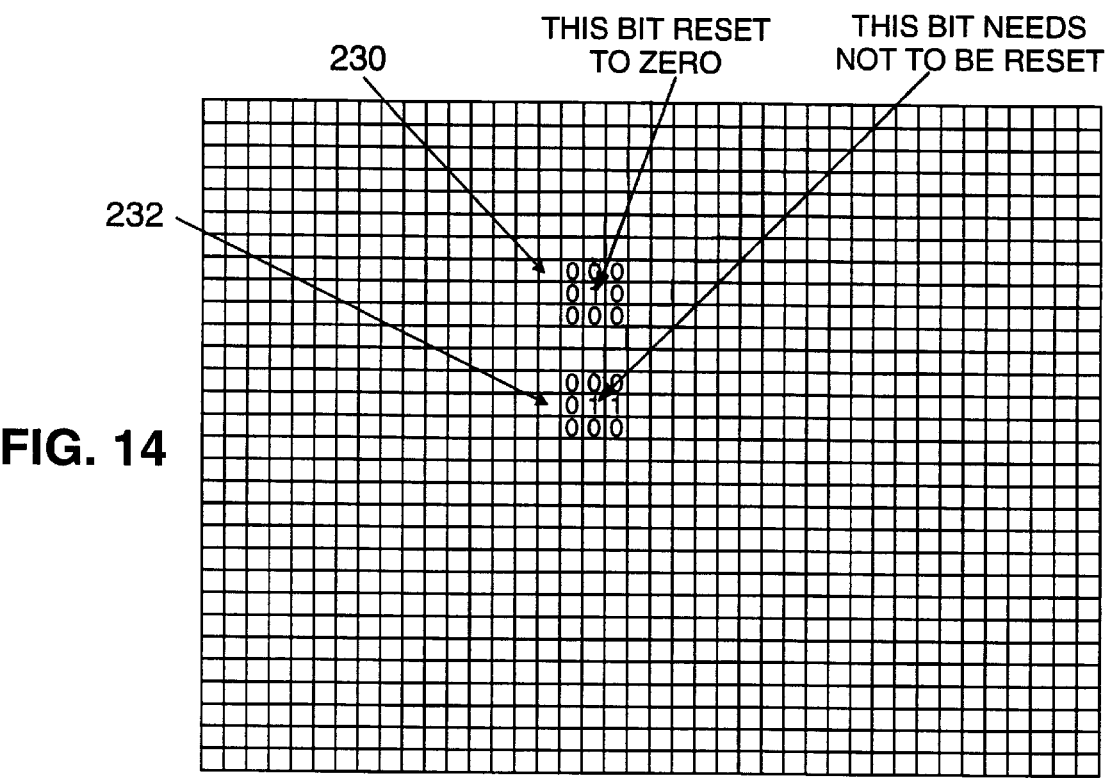
FIG. 14 is an illustration of the removal of isolated, non-zero blocks.

One bit is allocated to each 4×4 block to indicate whether it is an all zero vector. These bits form a 30×40 array, in the illustrated embodiment, and this array will be transmitted first followed by the vector quantization indices, one index for each non-zero bit in the array. However, prior to transmission, and in accordance with the preferred embodiment of the invention, a process is implemented to remove isolated non-zero quantized blocks. This procedure requires examination of each non-zero bit in the array and, if all of its eight nearest neighbors are zero, the bit is reset to zero also. Thus, no vector quantization index is transmitted for these reset blocks. This procedure is illustrated in connection with FIG. 14 where, in the blocks identified as blocks 230, the single block having a non-zero bit is reset to zero, while the vectors of the 3×3 array labeled 232 remain untouched.

Figure 15:
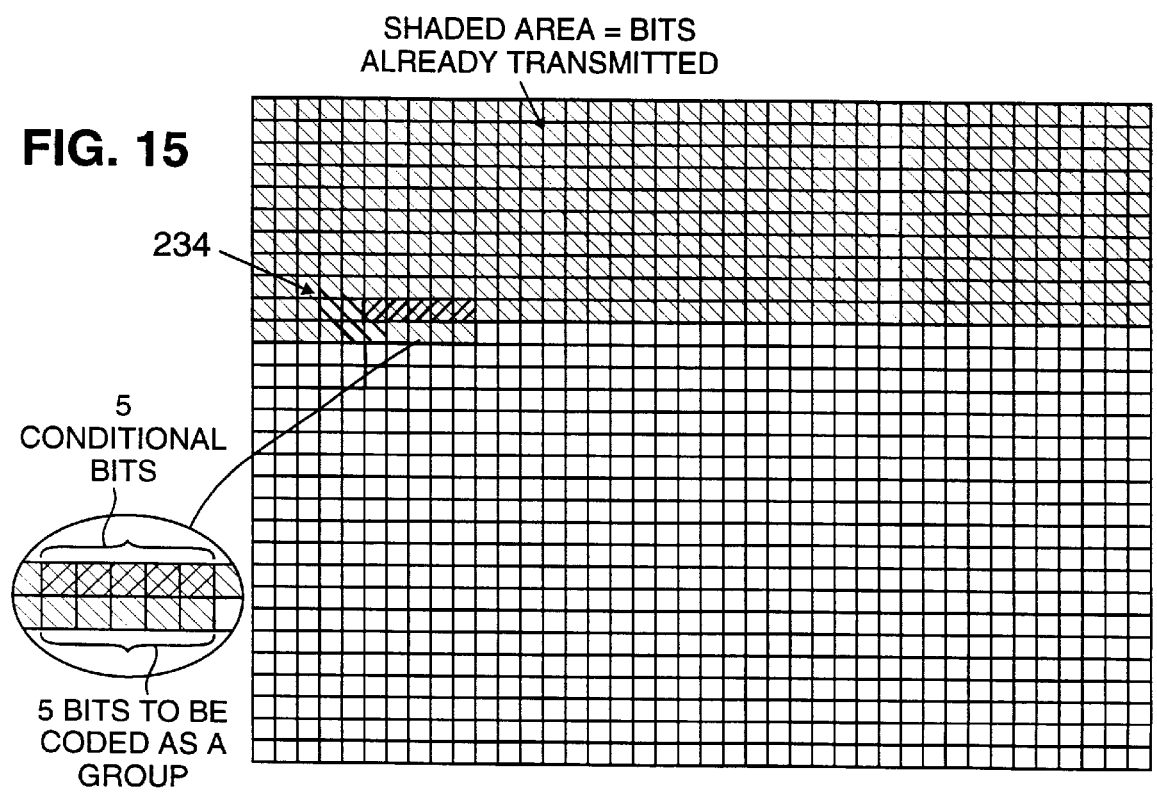
FIG. 15 is a diagrammatic representation of the encoding of the layer 2 vector quantization bit array.

The 30×40 bit array is then transmitted using a variable length coding method. The vector array bits are sent in groups of five as illustrated in FIG. 15. The bits are scanned in raster order; and for each group of five bits in FIG. 15, one of 32 vector quantization groups of tables is selected, the table to be selected being determined by the five conditional bits immediately above the current group of five to be transmitted. These conditional bits, identified in FIG. 15 as bits 234 thus identify a specific 32 state table which will be used to variable length encode the five bits to be transmitted.

The output of the residue quantizer 198 includes an encoded bitstream over lines 240 representing the input over line 216, and a reconstructed video frame over a line 244 representing the image obtained using the data in the bitstream on lines 240. The bitstream on lines 240 is combined by a multiplexor 254 with a bitstream over lines 242 from the scaler, indicating the scaling factor, and a bitstream from the temporal predictor 211 over lines 243, to form an output bitstream over lines 255. The reconstructed output of the residue quantizer is inversely scaled by inverse scaler 246 and the inverse scaler output is added to the output of the temporal prediction element 211 by a summer 248, to generate an output reconstructed frame available over a line 250. The reconstructed frame is stored in the frame memory 212 (becoming the next "sticky" frame at this level) if a switch 252 is in a closed position. The combined bitstream over lines 255 from multiplexer 254 is provided as the layer 2 output bitstream, to be appended to the layer 1 output bitstream. (In practice, the bitstream from each layer is transmitted over the network within its own data packet.)

The output of summer 248 is also provided, after upsampling, to the layer 3 partial codec for use in coding the input video at the layer 3 resolution. The layer 3 encoder, in accordance with the illustrated embodiment of the invention, corresponds to the layer 2 hybrid encoder structure except that instead of implementing a 16:1:1 YUV format, a 4:1:1 YUV format is implemented and each pixel, for each component is represented by eight bits. In layer 3, when the chrominance values are encoded, each grouping of (10×10) macroblocks will be a block of 80×80 layer 3 pixels containing sixteen 20×20 GMP's and sixty-four 10×10 macroblocks. Most importantly, the layer 3 hybrid encoder structure provides a continuation of the spatial scalability for the architecture described herein.

DETAILS OF THE TEMPORAL MODE PREDICTION

In operation, at layer 1, the decision as to which mode to use requires that the temporal mode be initialized to zero for each macroblock. The mode counters and error totals are also set to zero. Then, a check is performed to determine whether any blocks are going to be forced to be coded intraframe for this frame. If so, they are flagged, in the illustrated example by setting their temporal mode to −1. In order to determine and control refresh at this level, two parameters, $R_I$ which specifies the interval, in frames, between refreshings and $R_D$ which specifies the duration, in frames, over which the refresh is to be performed, are set. $R_D$ must be less than or equal to $R_I$. Thus, for example, if $R_D$ were set to 2, half of the blocks would be refreshed in one frame and the other half would be refreshed in the next frame. In any given refresh frame, the number of layer 1 macroblocks that actually are refreshed equals $n_R=(54/R_D)$ where 54 is the total number of both Y and C component macroblocks at layer 1.

The refresh logic is implemented, in this embodiment, with two counter variables $c_I$ and $C_B$. The counter $c_I$ simply counts the number of frames since the last refresh and begins a new refresh interval each time it reaches a count of $R_D$, at which time both it and $C_B$ are reset. The counter $C_B$ is incremented by $n_R$ each frame and as long as $C_B$ is less than 54, the macroblocks whose number lie between positions $C_B$ through the minimum of $(c_B+n_R-1)$ and 53 in a macroblock shuffle table are coded intraframe. Examples of the effects of various parameter settings are illustrated in FIG. 16.

The temporal mode decision procedure for each macroblock at layer 1 proceeds as follows.

1. Compute the intraframe error (that is, the summation of the squared pixel values of the current macroblock).
2. Check whether the block is forced to be coded with intraframe coding. If it is, do not perform any of the remaining error computations and set the temporal mode for the block to 0.
3. If the maximum temporal mode for the current component is at least one, determine the intraframe difference error which equals the sum of the squared values of the differences of the pixels of the current block and those of the corresponding block of the previous "sticky" frame.
4. If the maximum temporal mode for the current component is at least two, and if the intraframe error is above a specified "motion-search-abort" threshold value, set at 256 in this particular illustrated embodiment of the invention, the apparatus determines the best motion vector and the corresponding motion compensated error by performing a motion search. If the maximum temporal mode is 2, the motion search will be non-overlapped as described above, and if it is 3, the motion search will be overlapped.

5. The lowest error is then selected and the value representing the temporal mode for this "best" error is recorded for the current macroblock.

While the "motion-search-abort" threshold is a design parameter that can be varied, at the particular setting of 256, about 25% of the macroblocks are rejected. That is, the motion search is performed on 75% of the blocks. The maximum reasonable value for the threshold is approximately 4,096, at which point picture quality is still very good but about 75% of the blocks are rejected.

To keep the motion search as computationally simple as possible, a hierarchical motion search is employed. The motion search performed for each macroblock is conducted in two stages. At the first level of the search, reduced resolution versions of the current and reference blocks are compared. At a second level of the search, performed at full resolution, only a small neighborhood of motion vectors are examined. The second level search, thus, merely refines the results of the first level search. Accordingly, the basic procedure for the search is as follows.

1. Downsample the reference block by a factor of 2 in each dimension resulting in a 5×5 array.
2. Downsample the current block by a factor of 2 in each dimension, resulting, again, in a 5×5 array.
3. Perform a level 1 non-overlapping motion search on the downsampled blocks. The maximum excursion to be allowed, in the illustrated embodiment, for the motion vector is 2 pixels in either dimension, which corresponds to four (layer 1) pixels at full resolution.
4. Perform a level 2 non-overlapped motion search on the original full resolution blocks. The motion vectors being searched at this level are limited to those within a 1 pixel neighborhood of the vector which results from the level 1 search.

Thus, the maximum displacement that can result from the motion search is five (layer 1) pixels in each dimension.

As noted above, the first step in carrying out the level 1 motion search is to downsample both the current block and the reference block by a factor of 2 in each dimension. In the illustrated embodiment, the downsampling is accomplished by averaging the pixels of each resulting 2×2 microblock to generate a pixel in a downsampled 5×5 block. Then, for each possible displacement vector, a prediction block is generated by copying the reference block and then shifting a portion of it according to the given vector. Regardless of the value of the vector, within the allowable region, some portion of the prediction block, usually L-shaped, will exactly match the reference block. If the current motion vector is $v_i$, this region can be denoted by $l_{v,i}$. Note that for some vectors $v_i$ and $v_j$, there will be a significant amount of overlap between the regions $l_{v,i}$ and $l_{v,j}$. The operation performed on the pixels in the region which form the intersection of $l_{v,i}$ and $l_{v,j}$ are identical in the error computations for both the vectors $v_i$. and $v_j$, and this overlap can be exploited in order to reduce the overall operation count for the search.

The error measurement method employed separates each error summation $E_{v,i}$ into two smaller summations, one of which involves only interframe differences ($I_{v,i}$) and the other of which involves "truly" motion-compensated pixels ($M_{v,i}$). While the values $M_{v,i}$ must each be computed independently for each of the values of $v_i$, there is a large degree of redundancy in the computation of the partial sums which sum to the interframe differences $I_{v,i}$.

Figure 17:
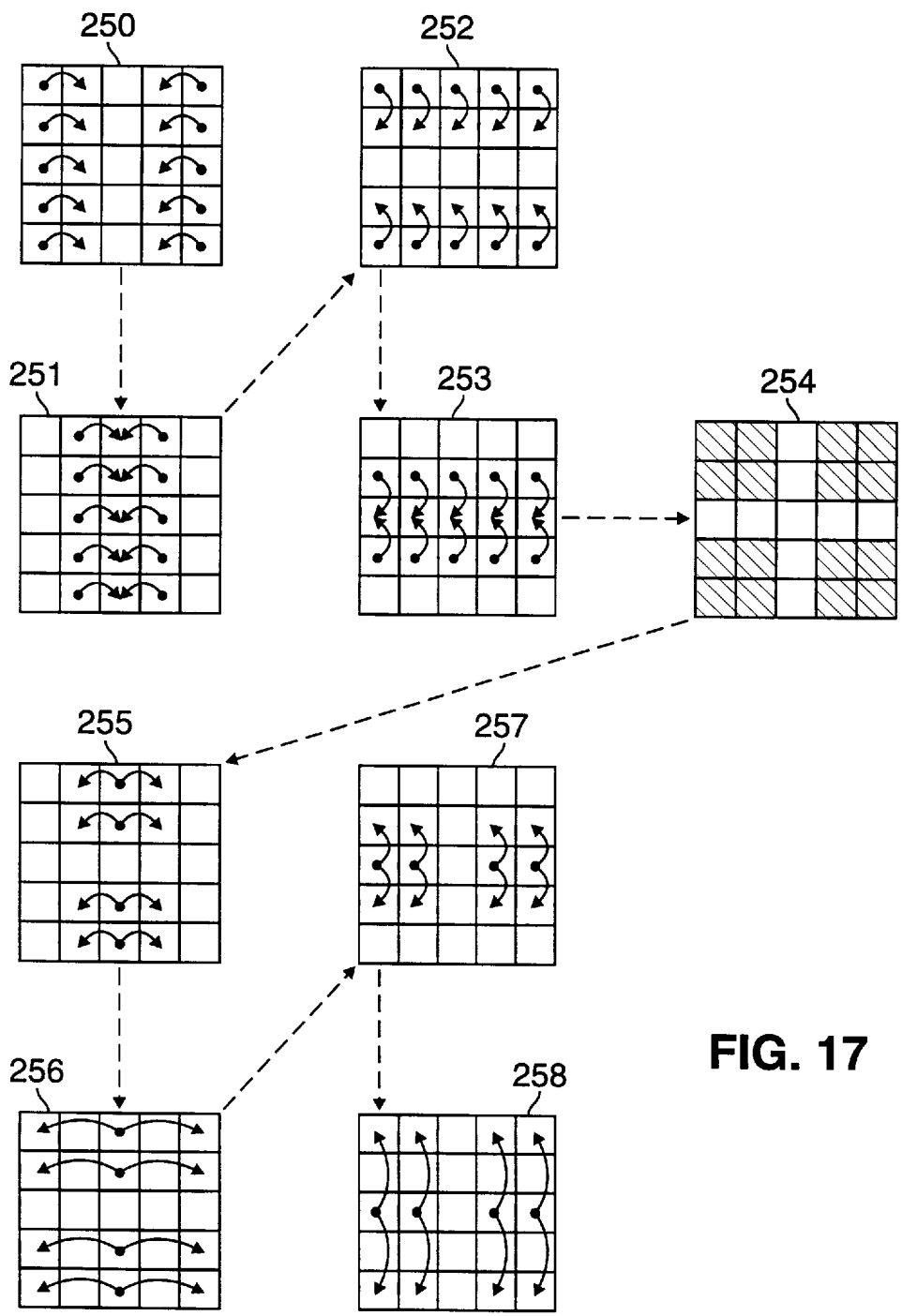
FIG. 17 is a diagrammatic representation of the computational flow for partial sums used in a level 1 motion search.

The first step in the determination of the partial sums is to generate the interframe difference between the downsampled current block and the downsampled reference block. Each of these differences is then squared and the resulting values are stored in a 5×5 (in the illustrated embodiment) array. These square interframe differences are then combined as illustrated in FIG. 17 to generate all of the partial sums $I_{v,i}$. This is a very, and perhaps the most, efficient method of performing this operation.

Referring to FIG. 17, the various operations are illustrated with regard to a 5×5 array 250 of squared values. In the representation of FIG. 17, a connected dot and arrow indicate the summation of the value represented in the position of the dot with the value represented in the position of the arrow, with the sum being placed at the location of the arrow. The original value in the block where the dot appears, remains unchanged. In accordance with this embodiment, the procedure involves the operations indicated in arrays 250, 251, 252, 253, 254, 255, 256, 257, and 258 in that order. The operation indicated in array 254 requires the negation, that is the multiplication by (−1), of those values in the shaded blocks.

The resulting array 258 then has, in each array position, the sum of the squares of the rows and columns detailed in FIG. 18. This information provides the necessary partial sums which are particularly useful in determining the best non-overlapping motion compensated vector.

The second level of the motion search method refines the motion vector found at the first level to within integer pixel accuracy. As noted above, the search neighborhood for the level 2 motion search is the one pixel region surrounding the best vector from the level 1 motion search. The search criterion, as in the case of a level 1 search, is a minimum mean square error criterion.

Further Details of the Implementation

After a temporal coding mode has been assigned to each macroblock, the total errors for the Y and C components of a frame are generated by accumulating the macroblock error sums for the frame. Macroblocks which were forced to be encoded intraframe are excluded from the summations and accordingly, the total error values are adjusted (normalized) to account for the fact that one or more blocks was not included in the total. Thus, in the illustrated embodiment, the total luminance error is multiplied by 48/(48−$f_y$) and the total chrominance error is multiplied by 6/631 $f_c$), where $f_y$ and $f_c$ are the number of forced intraframe blocks in the Y and C components, respectively. Once the mode selection has been performed, the coding of the layer 1 residual error proceeds as follows:

1. Initialize and determine the scaling factors.
2. Perform block by block DC, and then AC quantization.
3. Perform rate control to ensure that the network packet size is not exceeded.
4. Recombine the coded DC and AC information to form a new reference frame.

In more detail, these steps are carried out in the illustrated embodiment, as follows:

Upon initialization, the system determines the scaling components based on a typical log error relationship. A preferred method for implementing the scaling function is to generate "scaling indices" which point to a scaling look-up table (LUT). The equations for the scaling factors are:

$$\sigma_y = (E_y/4800)^{1/2} \qquad (1)$$

$$\sigma_c = (E_c/600)^{1/2} \qquad (2)$$

$$s_y = \max(0, \min(128, \sigma_y/4)) \quad (3)$$

$$s_c = \max(0, \min(128, \sigma_c/8)) \quad (4)$$

$$t_y = \text{round}(4 \log_2 s_y) \quad (5)$$

$$t_c = \text{round}(4 \log_2 s_c) \quad (6)$$

where $E_i$=total squared error for component i $\sigma_i$=standard deviation of component i $s_i$=scaling factor for component i $t_i$=scaling index for component i The only initialization that is required for the error coding method is to set to zero the macroblock coding map and microblock AC coding maps. Each entry in the macroblock coding map will thereafter contain three bits of information: 1 bit to indicate whether AC information is present in the coded macroblock, 1 bit to indicate whether DC information is present in the coded macroblock, and 1 bit to indicate whether the DC coding mode, if DC information is present, is a PCM or DPCM.

The microblock AC coding maps are used to indicate which microblocks of an AC-coded macroblock are to be coded with an AC vector. Coding maps such as these are not required for the DC information since every microblock of a DC coded macroblock is assumed to be coded with a DC value.

The quantization is performed in a block by block manner. The steps for performing quantization for each block are: (1) scaling block adjustment, (2) scaling, (3) computation of the DC values, (4) predictive coding of the DC information, (5) computation of the upsampled DC block, (6) computation of the AC values, and (7) vector quantization of the AC information.

As noted above, in order to suppress any artifacts which might arise from the forced intraframe refresh, all blocks coded in the intraframe temporal mode, regardless of whether they are forced or naturally occurring, are encoded with a higher fidelity than the rest of the blocks of the frame. In the illustrated embodiment, for the intraframe coded blocks, the otherwise normal scaling factor is adjusted by dividing it by 2 (to a minimum of 1).

All pixels in the macroblock are then divided by the adjusted scaling factor and the result is rounded to the nearest integral value. The 5×5 block of DC values is generated from the scaled 10×10 macroblock. The four pixels of each 2×2 microblock are averaged to determine the DC value for the microblock. In the illustrated embodiment, the following equation is used:

$$d_{i,j} = \text{floor}((P_{2i,2j} + P_{2i,2j+1} + P_{2i+1,2j} + P_{2i+1,2j+1} + 2)/4). \quad (7)$$

As noted above, either all DC values are 0, or the DC information is sent using PCM coding or differential PCM, DPCM, coding. In the illustrated embodiment, the DPCM prediction error method operates as follows.

1. The upper left DC value ($d_{0,0}$) is encoded individually, that is, by straight PCM.
2. The remaining DC values of the top row ($d_{0,i}$ for i=1, . . . , 4) are encoded using a one-dimensional predictor. The prediction errors $e_{0,i}$, rather than the DC values themselves, are passed to the entropy coder. The prediction equations are:

$$\hat{d}_{0,i} = d_{0,i-1} \quad (8)$$

$$e_{0,i} = d_{0,i} - \hat{d}_{0,1} \quad (9)$$
$$\quad = d_{0,i} - d_{0,i-1}$$

3. The remaining DC values of the left column ($d_{i,0}$ for i=1, . . . , 4) are encoded using a one-dimensional predictor. The prediction errors $e_{i,0}$, rather than the DC values themselves, are passed to the entropy coder. The prediction equations are:

$$\hat{d}_{i,0} = d_{i-1,0} \quad (10)$$

$$e_{i,0} = d_{i,0} - \hat{d}_{i,0} \quad (11)$$
$$\quad = d_{i,0} - d_{i-1,0}$$

4. The remaining DC values ($d_{i,j}$ for i=1, . . . , 4, j=1, . . . . 4) are encoded using a two-dimensional predictor. The prediction errors $e_{i,j}$, rather than the DC values themselves, are passed to the entropy coder. The prediction equations are $$\hat{d}_{i,j} = \begin{cases} d_{i,j-1} & \text{for } |d_{i-1,j} - d_{i-1,j-1}| < |d_{i,j-1} - d_{i-1,j-1}| \\ d_{i-1,j} & \text{otherwise} \end{cases} \quad (12)$$

$$e_{i,j} = d_{i,j} - \hat{d}_{i,j} \quad (13)$$

In the illustrated embodiment, these computations are made by determining all of the values $d_{i-1,j} - d_{i,j-1}$ and $d_{i,j-1} - d_{i-1,j-1}$ in advance, and then deciding which error value should be used for each 16 predicted DC values.

Following the computation of the DPCM prediction errors, the number of bits required to code the DC values using both pulse code modulation and differential pulse code modulation is determined. In the illustrated embodiment, these counts are determined using look up tables to obtain the number of bits required for each DC value and then adding those numbers for each of the coding options. The DC values are then encoded and sent using the most efficient method.

Following the computation of the DC values, the 5×5 array of DC values is upsampled, as noted above, to obtain a 10×10 low frequency macroblock. The upsampling is performed, as noted above, with an FIR filter and the particular manner of optimizing the operations will depend upon the system architecture. Preferably, where fixed point architectures are available, shift operations and additions can effect the upsampling quite efficiently.

The vector quantization of the AC information is performed on the 10×10 macroblock of AC values. Each non-zero microblock of AC values is encoded using an AC vector quantizer code book which consists of 256 entries (each entry represents a 2×2 array of pixel values) which are arranged in a tree having a branching factor of 4 as noted above. A single search through the code book finds the entry most closely matching the given AC microblock vector.

In the illustrated embodiment, it has been found that about 85% of all AC vectors have their pixel values in the range [−2, 2] and that a fast LUT method can be used to bypass the vector quantization code book search for most vectors. Thus, if a vector ($p_0$, $p_1$, $p_2$, $p_3$) lies within a hypercube of dimension four, centered at (0,0,0,0) (and thus having each edge equal to four in length,) an index value $I_{vq}$ can be determined as follows:

$$I_{vq} = 5(5(5p_0 + p_1) + p_2) + p_3$$

This index computation on average is required for about 600 microblocks per frame.

As noted above, the total number of bits, in the illustrated embodiment, is maintained at less than 1400 bytes. Accordingly, the number of bits required to code the Y and C components at this layer is determined and if it exceeds 1400 bytes (11200 bits), the following steps are performed:

1. Set the variable MAB threshold to the value 1.
2. Start with a random microblock.
3. Check if the microblock is coded, and if it is, continue the method, otherwise select another microblock and begin at step 3 again.
4. Check whether the absolute value of the coded AC component of the microblock, that is, the maximum absolute value of each element of the code book vector that was selected for this microblock, is less than or equal to the threshold.
5. If each element is not greater than the threshold, zero the AC component for the microblock, zero the corresponding bit in the microblock selection map, and deduct the appropriate number of bits from the total.
6. If all microblocks have been checked in step 4, and the bit count is still above the threshold of 1400 bytes, increase the MAB threshold and repeat steps 2–6. If all microblocks have not been checked, select another microblock and proceed to step 3.

After the rate control process has been completed, the AC and DC components of the image are added together, and reverse scaled to generate a reference frame for use with the next encoded frame (this process is performed only if the current frame will be a "sticky frame"). The resulting image is stored in a frame memory 94.

In the illustrated embodiment, the layer 1 bitstream is generated after all other processing of the frame is completed. The reason is that the bitstream generation may change depending upon the rate control logic. The generation of the bitstream in the illustrated embodiment, follows the following steps for each of the Y and C components:

1. First, the scaling index (6 bits) and the maximum temporal mode (2 bits) are assembled into a byte and written.
2. For each macroblock in the component, the temporal mode is written. This information, depending upon the value of the maximum temporal mode, can require 0, 1 or 2 bits per macroblock.
3. For each macroblock that was motion compensated, the X and Y components of the motion vector are assembled into a byte and output.
4. For each macroblock, a 2 bit output is provided to indicate whether there is DC and/or AC information present.
5. For each macroblock with DC information, the output DC coding mode bit is sent.
6. For each macroblock with AC information, the 25 bit AC coding map indicating which microblocks have AC data is sent.
7. For each macroblock that was coded with DC information, the information is output, preferably using a variable length DC code.
8. For each AC microblock of each macroblock with AC information, the vector quantization code book index is written. This index can be coded in either an 8 bit fixed length format or a variable length Hoffman coding format.

The particular implementation of the layer 2 and layer 3 partial codec systems follows along the same line as the layer 1 subsystem except that the DC encoding is omitted.

Other than the DC encoding, as described in detail above, the layer 2 and layer 3 partial codec subsystems operate in substantially the same manner as the layer 1 subsystem.

The thus generated and encoded video, is then packaged and processed for transmission over the network. The packaging, as noted above, is such that the layer 1, layer 2, and layer 3 bitstreams can be separably decoded, so that for example, the decoder, even though it receives all three layers, can choose to decode only the layer 1 bitstream. Accordingly, and as disclosed above, the decoded bitstream also needs only to use those temporal frames, designated sticky frames, so that further computing cycles can be saved at the decoder.

Figure 19:
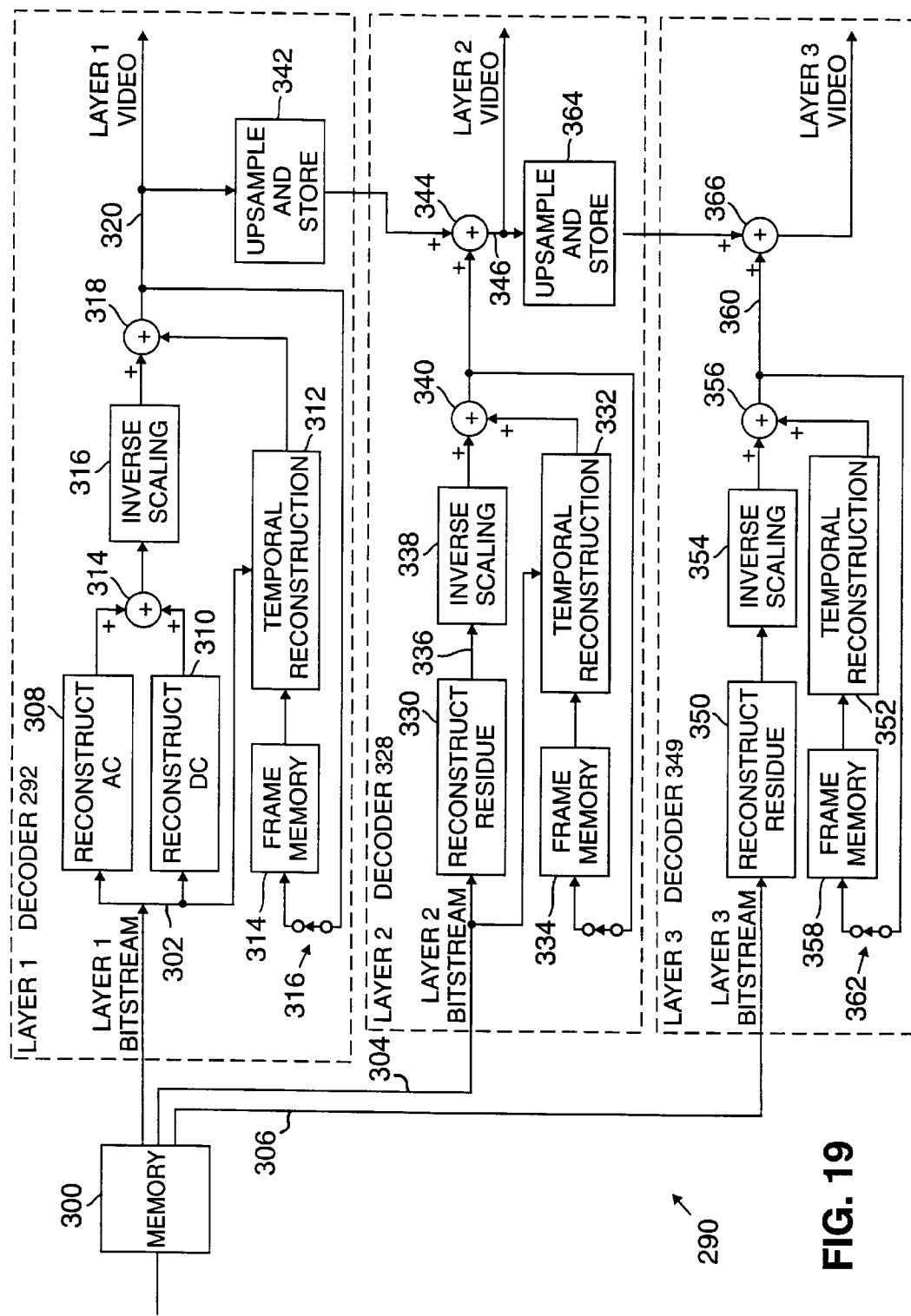
FIG. 19 is a block diagram illustrating the decoder portion of a codec in accordance with the invention.

Referring to FIG. 19, in a decoder 290, according to the invention, the incoming bitstream is first divided into layer 1, layer 2, and layer 3 information and the data required by the decoder is saved in a memory 300. The memory can provide outputs for layer 1 decoding over a line 302, for layer 2 decoding over a line 304, and for layer 3 decoding over a line 306, as necessary. Each of the bitstreams stored in memory 300 corresponds to the bitstream provided over the network at that layer. In the illustrated embodiment, the system can decode the layer 1 information without the need for layer 2 or layer 3 information. Similarly a system can decode layer 2 information without requiring layer 3 information and, if interlayer dependency has been removed, without requiring layer 1 information although that is not the manner in which the preferred embodiment of the invention is intended to operate. At layer 3, preferably, all three layers are decoded and used.

A layer 1 decoder 292 takes the incoming bitstream and divides it to reconstruct the AC quantized video, the DC quantized video, and the temporal video reconstruction through elements 308, 310, and 312, respectively. The temporal reconstruction element 312 receives from a frame memory 314 the most recent "sticky" frame. That frame, which is provided to the memory 314 through a switch 316, represents the output of the layer 1 decoder for the previous frame designated as a sticky frame. The output of the quantization reconstruction elements 308 and 310 are summed in an adder 314. The output of the adder is then inverse scaled by a scaler 316. The output of the scaler and the output of the temporal reconstruction element are summed by an adder 318, the output of which is the layer 1 decoded video over a line 320.

In the layer 2 decoder 328, the layer 2 video can be reconstructed in a similar manner. The output of the memory comprising the layer 2 bitstream is divided to enable a reconstruction residue element 330 to reconstruct the quantized high frequency information contained in the layer 2 bitstream; and a temporal reconstruction element 332 takes the most previously stored sticky frame in frame memory 334 and produces the reconstructed layer 2 temporal output signal. The reconstructed and quantized residue over a line 336 is passed through an inverse scaler 338, the output of which is summed with the output of the temporal reconstruction element in an adder 340. The output of the layer 1 circuitry is upsampled and stored in a storage element 342. The output of the upsampled and stored layer 1 video is combined with the summed temporal and reconstructed residue video in an adder 344 to produce the layer 2 video over a line 346.

The layer 3 video is reconstructed in a manner substantially the same as the layer 2 video. In the layer 3 decoder 349, the layer 3 bitstream is divided and directed to a reconstruction residue element 350 and to a temporal reconstruction element 352. The reconstruction residue element 350 provides its reconstructed video to an inverse scaler 354, the output of which is directed to an adder 356. The temporal reconstruction circuitry receives the output of a frame memory 358 and provides, at its output, a temporal reconstruction which is summed with the inversely scaled residue frame reconstruction in adder 356, and provided over a line 360. The output of the layer 3 video reconstruction circuitry over line 360 is stored in frame memory 358 by the closing of switch 362 if that frame is considered a "sticky" frame. The output of the layer 3 video reconstruction is also summed with the output of an upsample and storage element 364, operating in the same manner as element 342, to produce, at the output of summer 366, the layer 3 video. In this manner, the decoder can produce either layer 1 video, layer 2 video, or layer 3 video (or all of them) depending upon the computing capability, or other requirements, of the system.

The resulting video is then displayed on a display device for presentation to the user. As noted above, in a particular embodiment, it is desirable to display several received video signals on the display device, even if only at layer 1 resolution, due to computing limitations of the PC terminal platform, to enable the user to see and identify each of the speakers with which he or she is videoconferencing.

In addition to the flexible temporal and spatial scalability identified above, for use over a network where there is no guarantee of bandwidth, data throughput, or a constant connection quality, the invention provides additional advantages where terminals are engaged in a video conference which can include, for example, application sharing. In such an instance, the terminals can scale back to a lower resolution (either temporal or spatial, or both) to enable additional bandwidth to be available for the application sharing data transmission. In this instance, while the network capacity may not change, the effective network resource capacity does change, as viewed by the terminals, since some of that resource is required for other uses by the terminal. In effect then, either the terminal capacity might change or the network capacity might change, and in either instance, the resolution of the transmitted image sequence will be adjusted to a lower one of the predetermined resolutions available to the terminal. The method for selecting the desired resolution thus depends on the resource available capacity of the network as viewed by the terminal and is based upon both the actual terminal capacity as well as the requirements for additional applications for which the channel will be used by the terminal.

Additions, subtractions, and other modifications of the disclosed and claimed invention will be apparent to those practiced in the art and are within the scope of the following claims.

What is claimed is:

1. A method for providing a videoconference between at least two terminals connected over a scalable network comprising the steps of encoding at one terminal an image sequence for transmission of a single image data sequence onto the network for decoding at either of at least two spatial resolutions and at either of at least two frame rates, decoding said encoded image sequence at at least one other said terminal at a spatial resolution and frame rate selected by said at least one other terminal, and displaying said decoded image sequence at said selected spatial resolution level and frame rate.

2. The videoconferencing method of claim 1 further wherein said encoding step comprises the steps of encoding a difference image representing a difference between the current frame to be encoded and a reference frame, and generating said reference frame using at least one temporally earlier frame selected from a previously reconstructed frame occurring no more than a predetermined fixed number of frames earlier than the current frame.

3. The videoconferencing method of claim 1 wherein said decoding step further comprises the step of decoding said encoded image sequence at different frame rates at different times at one of the terminals.

4. The video conferencing method of claim 1 wherein said decoding step comprises the step of decoding said encoded image sequence at different frame rates at different terminals.

5. The videoconferencing method of claim 1 wherein said decoding step comprises the step of decoding a received image sequence at a frame rate different than the encoding frame rate at the decoding terminal.

6. The videoconferencing method of claim 1 wherein said decoding step further comprises the step of decoding said encoded sequence at a spatial resolution different than the encoding spatial resolution at the decoding terminal.

7. The videoconferencing method of claim 1 wherein said decoding step further comprises the step of decoding said encoded image sequence at different spatial resolutions at different terminals.

8. The videoconferencing method of claim 1 wherein said encoding step further comprises the steps of encoding a difference image representing the difference between the current frame and an upsampled representation of a spatially lower resolution reconstructed frame, and generating an encoded data stream separably decodable at at least a lower and a higher spatial resolution, said lower resolution being decodable without decoding any portion of the data stream corresponding to the higher resolution encoding.

9. The method of claim 1 further wherein said encoding step comprises the step of forcing a periodic refreshing of said image sequence, the period of refreshing being defined by a first parameter, "t", and the fraction of the image to be refreshed at one frame time being defined by a second parameter "p", and where "1/p" has a value is no greater than "t".

10. The method of claim 1 wherein said encoding step comprises the steps of dividing said image into a plurality of blocks, for each block, selecting from a plurality of reference blocks a temporal prediction of the block, one of the reference blocks being generated by a non-overlapping motion compensation method.

11. The method of claim 1 wherein said encoding step comprises the steps, for each frame, of downsampling said input image sequence to form a first downsampled image sequence, determining a temporal prediction of said first downsampled image sequence, generating a temporal prediction parameter indicative of the temporal prediction used, subtracting said temporal prediction from said first downsampled image sequence to form a first difference sequence, scaling said difference sequence for reducing the maximum amplitudes of sequence components, generating a scaling value corresponding to said scaling step, DC quantizing said scaled difference sequence to generate a DC quantized sequence and a DC quantization bitstream, subtracting the DC quantized sequence from the scaled sequence to generate an AC input sequence, quantizing said AC input sequence to generate an AC quantized sequence and an AC quantization bitstream, summing said AC quantized sequence and said DC quantized image to generate a second summed sequence, inverse scaling, using said scaling value, said second summed sequence, and adding to the inverse scaled sequence said temporal prediction to generate a reconstructed image sequence.

12. The method of claim 11 further comprising the steps of selectively storing said reconstructed image, and said temporal prediction determining step using said stored image for determining said temporal prediction.

13. The method of claim 11 further comprising the steps of upsampling the reconstructed image sequence to a higher resolution to form an upsampled image sequence, selectively storing said upsampled image sequence, selectively subtracting the most recently stored upsampled image sequence from an input sequence, derived from said input image sequence, at the same resolution, to form a differential high-pass image sequence, determining a second temporal prediction of said differential high-pass image sequence, generating a second temporal prediction parameter indicative of the temporal prediction used at this higher resolution, subtracting said second temporal prediction from said differential image sequence for forming a second high-pass image sequence to the encoded, scaling said second high-pass image sequence for reducing the maximum amplitudes of components of said second high-pass image sequence and for generating a second scaling value, quantizing the scaled second high-pass image sequence for producing a vector quantized image sequence and a sequence of vector codewords, inversely scaling said vector quantized image sequence using said second scaling factor for generating a second inversely scaled image sequence, and adding said second inversely scaled image sequence and said second temporal prediction image sequence for generating a higher resolution reconstructed image.

14. The method of claim 13 further comprising the step of selectively storing said higher resolution reconstructed image, and wherein said second temporal prediction determining step uses the most recently stored higher resolution reconstructed image for determining said second temporal prediction.

15. The method of claim 11 further comprising the steps of separately encoding the luminance and chrominance components of said input image, and combining, prior to said encoding step, the U and V chrominance components by flipping one of said components to form a C component.

16. The method of claim 13 further comprising the steps of separately encoding the luminance and chrominance components of the input image, and combining, prior to said en coding setup, the U and V components by flipping one of said components to form a C component.

17. A method for videoconferencing between at least three terminals over a scalable network comprising the steps of encoding at at least two terminals, respective image sequences for transmission of each as a single image data sequence onto the network for decoding at any of the other terminals on the network at either of at least two spatial resolutions and at either of at least two frame rates, decoding, at at least one terminal, the encoded sequences from at least two other terminals at frame rates and spatial resolutions selected by said at least one terminal, and simultaneously displaying at said one terminal, the image sequences from at least said two other terminals at selected spatial resolutions and frame rates.

18. A method for providing a videoconference between at least two terminals connected over a scalable network comprising the steps of encoding at one terminal an image sequence into a bitstream for transmission of a single image data sequence comprising at least two spatial resolutions, onto the network for decoding at either of at least two spatial resolutions, decoding said encoded image sequence at at least one other said terminal at one of said spatial resolutions selected by at least one other said terminal, and displaying said decoded image sequence at said selected spatial resolution level.

19. The videoconferencing method of claim 18 further comprising the steps of separating said bitstream into a plurality of network packets, at least a first packet including the information required to reconstruct an image at a lowest resolution level and a second packet, when combined with the information in the first packet, including information required to reconstruct an image at a higher resolution level, and requiring, during said encoding step, that the number of bits in each packet be less than a predetermined threshold value associated with the network.

20. A method for providing a videoconference between at least two terminals connected over a scalable network comprising the steps of encoding at one terminal an image sequence for transmission of a single image data sequence onto the network for decoding at either of at least two frame rates, decoding said encoded image sequence at at least one other said terminal at one of said frame rates selected by said at least one other said terminal, and displaying said decoded image sequence at said selected frame rate.

21. The method of claim 20 wherein said decoding step comprises the step of varying which frame rate is chosen at a receiving terminal depending upon the computing resources available at the receiving terminal at a display time.

22. A method of encoding a signal representing a video sequence of digitally sampled image frames comprising the steps of downsampling said video sequence to a lower resolution, encoding each frame of said image sequence at said lower resolution for generating a low resolution coded bitstream and a low resolution reconstructed frame sequence representing said lower resolution image sequence, upsampling said low resolution reconstructed frame sequence to generate a higher resolution reconstructed frame sequence, subtracting said higher resolution reconstructed frame sequence from said video sequence at a higher resolution to generate a high-pass sequence at said higher resolution, encoding said high-pass sequence for generating a high-pass coded bitstream representing said high-pass sequence, and transmitting said low resolution coded bitstream and said high-pass coded bitstream as a single data image sequence to a distant decoding terminal.

23. The encoding method of claim 22 further comprising the steps of extending said downsampling and upsampling steps to provide encoding at three different spatial resolutions.

24. An apparatus for providing a videoconference between at least two terminals connected over a scalable network comprising an encoder at one terminal for encoding an image sequence for transmission as a single data image sequence onto the network for decoding at either of at least two spatial resolutions and at either of at least two frame rates, a decoder for decoding said encoded image sequence at at least one other said terminal at a spatial resolution and frame rate selected by said at least one other said terminal, and a display for receiving said decoded image sequence and displaying said decoded image sequence at said selected spatial resolution and frame rate.

25. The videoconferencing apparatus of claim 24 further wherein said encoder comprises an encoder for encoding a difference image representing a difference between the current frame to be encoded and a reference frame, and circuitry for generating said reference frame using at least one temporally earlier frame selected from a previously reconstructed frame occurring no more than a predetermined fixed number of frames earlier than the current frame.

26. The videoconferencing apparatus of claim 24 wherein said decoder further comprises circuitry for decoding said encoded image sequence at different frame rates at different time at one of the terminals.

27. The videoconferencing apparatus of claim 24 wherein said decoder comprises a decoder for decoding said encoded image sequence at different frame rates at different terminals.

28. The videoconferencing apparatus of claim 24 wherein said decoder comprises a decoder circuitry for decoding a received image sequence at a frame rate different than the encoder frame rate at the same terminal.

29. The videoconferencing apparatus of claim 24 wherein said decoder further comprises circuitry for decoding the encoded sequences at a spatial resolution different than the encoding resolution at the decoding terminal.

30. The videoconferencing apparatus of claim 24 wherein said decoder further comprises circuitry for decoding said encoded image sequence at different spatial resolutions at different terminals.

31. The videoconferencing apparatus of claim 24 wherein said encoder further comprises an encoder for encoding a difference image representing the difference between the current frame and an upsampled representation of a spatially lower resolution reconstructed frame, and circuitry for generating an encoded data stream separably decodable at at least a lower and a higher spatial resolution, said lower resolution being decodable without decoding any portion of the data stream corresponding to the higher resolution encoding.

32. The apparatus of claim 24 further wherein said encoder comprises elements for forcing a periodic refreshing of said image sequences, the period of refreshing being defined by a first parameter, "t", and the fraction of the image to be refreshed at one frame time being defined by a second parameter "p", and where "1/p" has a value no greater than "t".

33. The apparatus of claim 24 wherein said encoder comprises a divider for dividing said image into a plurality of blocks, and for each block, circuitry for selecting from a plurality of reference blocks a temporal prediction of the block, one of the reference blocks being generated by a non-overlapping motion compensation.

34. The apparatus of claim 24 wherein said encoder comprises, for each frame, a downsampling filter operating on said input image sequence to form a first downsampled image sequence, a temporal predictor for determining a temporal prediction of said first downsampled image sequence, and generating a temporal prediction parameter indicative of the temporal prediction used, a differencer for subtracting said temporal prediction from said first downsampled image sequence to form a first difference sequence, a scaler for scaling said difference sequence for reducing the maximum amplitudes of sequence components, and generating a scaling value corresponding to said scaling step, a DC quantizer for DC quantizing said scaled difference sequence to generate a DC quantized sequence and a DC quantization bitstream, a second differencer for subtracting the DC quantized sequence from the scaled sequence to generate an AC input sequence, an AC quantizer for quantizing said AC input sequence to generate an AC quantized sequence and an AC quantization bitstream, an adder for summing said AC quantized sequence and said DC quantized image to generate a second summed sequence, an inverse scaler, which using said scaling value, inverse scales said second summed sequence, and a second adder for adding to the inverse scaled sequence said temporal prediction to generate a reconstructed image sequence.

35. The apparatus of claim 34 further comprising a memory for selectively storing said reconstructed image, and said temporal predictor using said stored image for determining said temporal prediction.

36. The apparatus of claim 34 further comprising an upsampling filter for upsampling the reconstructed image sequence to a higher resolution to form an upsampled image sequence, a second memory for selectively storing said upsampled image sequence, a third subtractor for selectively subtracting the most recently stored upsampled image sequence from an input sequence, derived from said input image sequence, at the same resolution to form a differential high-pass image sequence, a second temporal predictor for determining a second temporal prediction of said differential high-pass image sequence, circuitry for generating a second temporal predictor parameter indicative of the temporal prediction used at this higher resolution, a fourth subtractor for subtracting said second temporal prediction from said differential image sequence for forming a second high-pass image sequence to the encoded, a second scaler for scaling said second high-pass image sequence for reducing the maximum amplitudes of components of said second high-pass image sequence and for generating a second scaling value, a second quantizer for quantizing the scaled second high-pass image sequence for producing a vector quantized image sequence and a sequence of vector codewords, an inverse scaler for inversely scaling said vector quantized image sequence using said second scaling factor for generating a second inversely scaled image sequence, and an adder for adding said second inversely scaled image sequence and said second temporal prediction image sequence for generating a higher resolution reconstructed image.

37. The apparatus of claim 36 further comprising memory for selectively storing said higher resolution reconstructed image, and wherein said second temporal prediction determining step uses the most recently stored higher resolution reconstructed image for determining said second temporal prediction.

38. The apparatus of claims 36 further comprising encoder means for separately encoding the luminance and chrominance components of said input image, and a combiner for combining the U and V chrominance components by flipping one of said components to form a C component.

39. The apparatus of claim 34 further comprising an encoder for separately encoding the luminance and chrominance components of the input image, and a combiner for combining, prior to operation thereon by said encoder, the U and V components by flipping one of said components to form a C component.

40. An apparatus for videoconferencing between at least three terminals over a scalable network comprising an encoder for encoding at at least two terminals, respective image sequences for transmission of each as a single data image sequence onto the network for decoding at any of the other terminals on the network at either of at least two spatial resolutions and at either of at least two frame rates, a decoder for decoding, at at least one terminal, the encoded sequences from at least two other terminals at frame rates and spatial resolutions selected by said one terminal, and a display for simultaneously displaying at said one terminal, the image sequences from at least said two other terminals at selected spatial resolutions and frame rates.

41. An apparatus for providing a videoconference between at least two terminals connected over a scalable network comprising an encoder for encoding at one terminal an image sequence into a single data image bitstream comprising at least two spatial resolutions, for transmission onto the network for decoding at either of at least two spatial resolutions, a decoder for decoding said encoded image sequence at at least one other said terminal at one of said spatial resolutions selected by said at least one other said terminal, and a display for displaying said decoded image sequence at said selected spatial resolution level.

42. The videoconferencing apparatus of claim 41 further comprising circuitry for separating said bitstream into a plurality of network packets, at least a first packet including the information required to reconstruct an image at a lowest resolution level and a second packet, when combined with the information in the first packet, including information required to reconstruct an image at a higher resolution level, and said circuitry requiring, during said encoding step, that the number of bits in each packet be less than a predetermined threshold value associated with the network.

43. An apparatus for providing a videoconference between at least two terminals connected over a scalable network comprising an encoder for encoding at one terminal an image sequence for transmission as a single data image sequence onto the network for decoding at either of at least two frame rates, a decoder for decoding said encoded image sequence at at least one other said terminal at one of said frame rates selected by said at least one other said terminal, and a display for displaying said decoded image sequence at said selected frame rate.

44. The apparatus of claim 43 wherein said decoder comprises circuitry for varying which rate is chosen at a receiving terminal depending upon the computing resources available at the receiving terminal at a display time.

45. An apparatus for encoding a signal representing a video sequence of digitally encoded image frames comprising a downsampling filter for downsampling said video sequence to a lower resolution image sequence, an encoder for encoding each frame of said image sequence at said lower resolution for generating a low resolution coded bitstream and a low resolution reconstructed frame sequence representing said lower resolution image sequence, an upsampling filter for upsampling said low resolution reconstructed frame sequences to generate a higher resolution reconstructed frame sequence, a differencer for subtracting said higher resolution reconstructed frame sequence from said video sequence at a higher resolution to generate a high-pass sequence at said higher resolution, a second encoder for encoding said high-pass sequence for generating a high-pass coded bitstream representing said high-pass sequence, and a transmitter for transmitting said low resolution coded bitstream, and said high-pass coded bitstream, as a single image data bitstream to a distant decoding terminal.

46. The encoder of claim 22 further comprising means for extending said downsampling and upsampling to provide encoding at at least three different spatial resolutions.

47. A method for providing a videoconference between at least two terminals connected over a network comprising the steps of encoding at one terminal, at a selected one of at least two predetermined resolutions, an image sequence for transmission onto the network for decoding at an other one of said terminals, decoding said encoded image sequence at said other terminal at said selected resolution, selecting said selected resolution depending upon an available changing capacity of said network, said selected resolution changing when the network capacity changes, and displaying said decoded image sequence at said selected resolution at said other terminal.

48. The method of claim 47 wherein the resource available capacity of the network changes as the error rate of the network changes.

49. The method of claim 47 wherein the resource available capacity of the network changes when the terminals simultaneously require use of the network for at least one software application in addition to the videoconference.

50. Apparatus for providing a videoconference between at least two terminals connected over a network comprising an encoder for encoding at one terminal, at a selected one of at least two predetermined resolutions, an image sequence for transmission onto the network for decoding at an other one of said terminals, a decoder for decoding said encoded image sequence at said other terminal at said selected resolution, a controller for selecting said selected resolution depending upon an available changing capacity of said network, said selected resolution changing when the network resource capacity changes, and a display for displaying said decoded image sequence at said selected resolution at said other terminal.

51. The apparatus of claim 50 wherein the resource available capacity of the network changes as the error rate of the network changes.

52. The apparatus of claim 50 wherein the available capacity of the network changes when the terminals simultaneously require use of the network for at least one software application in addition to the videoconference.

53. The method of claim 1 wherein the scalable network is a packet-switched network.

54. The method of claim 53 wherein the packet-switched network is a local area network.

55. The method of claim 53 wherein the packet-switched network is a metropolitan area network.

56. The method of claim 53 wherein the packet-switched network is a wireless network.

57. The method of claim 1 wherein the scalable network is a circuit-switched network.

58. The method of claim 57 wherein the circuit-switched network is a cellular telephone network.

59. The apparatus of claim 24 wherein the scalable network is a packet-switched network.

60. The apparatus of claim 59 wherein the packet-switched network is a local area network.

61. The apparatus of claim 59 wherein the packet-switched network is a metropolitan area network.

62. The apparatus of claim 59 wherein the packet-switched network is a wireless network.

63. The apparatus of claim 24 wherein the scalable network is a circuit-switched network.

64. The apparatus of claim 63 wherein the circuit-switched network is a cellular telephone network.

* * * * *